United States Patent
Wang et al.

(10) Patent No.: US 12,418,929 B2
(45) Date of Patent: Sep. 16, 2025

(54) PARAMETER CONFIGURATION METHOD AND APPARATUS

(71) Applicant: HUAWEI TECHNOLOGIES CO., LTD., Guangdong (CN)

(72) Inventors: Ting Wang, Shanghai (CN); Jinlin Peng, Shanghai (CN); Hao Tang, Shanghai (CN); Zhenfei Tang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 964 days.

(21) Appl. No.: 17/125,221

(22) Filed: Dec. 17, 2020

(65) Prior Publication Data

US 2021/0105783 A1  Apr. 8, 2021

Related U.S. Application Data

(63) Continuation of application No. PCT/CN2019/090427, filed on Jun. 6, 2019.

(30) Foreign Application Priority Data

Jun. 22, 2018 (CN) .......................... 201810654748.1

(51) Int. Cl.
*H04W 72/53* (2023.01)
*H04L 5/00* (2006.01)
(Continued)

(52) U.S. Cl.
CPC .......... *H04W 72/53* (2023.01); *H04L 5/0094* (2013.01); *H04W 72/0453* (2013.01); *H04W 72/23* (2023.01)

(58) Field of Classification Search
CPC . H04W 72/53; H04W 72/0453; H04W 72/23; H04W 72/044; H04L 5/0094; H04L 5/0044; H04L 5/001
(Continued)

(56) References Cited

U.S. PATENT DOCUMENTS 8,284,732 B2  10/2012  Nimbalker et al.
2007/0143036 A1*  6/2007  Stratis ................. G01N 23/00
702/28
(Continued)

FOREIGN PATENT DOCUMENTS

CN  101820645 A  9/2010
CN  108093481 A  5/2018
(Continued)

OTHER PUBLICATIONS

3GPP TS 38.211 V15.1.0 (Mar. 2018); 3rd Generation Partnership Project; Technical Specification Group Radio Access Network; NR;Physical channels and modulation(Release 15);total 90 pages.
(Continued)

*Primary Examiner* — Thuong Nguyen
(74) *Attorney, Agent, or Firm* — WOMBLE BOND DICKINSON (US) LLP

(57) ABSTRACT

Embodiments of this application relate to the communications field, and disclose a parameter configuration method, to resolve a problem of how to determine a parameter of a second-type bandwidth part BWP in a case of a discrete spectrum. A solution includes: for the parameter of the second-type BWP, determining a parameter determining rule based on a parameter type of the second-type BWP, where the second-type BWP includes N frequency domain resources, N is a positive integer, and N is greater than or equal to 2; and determining a parameter value of the second-type BWP according to the parameter determining
(Continued)

rule. The embodiments of this application relate to a process of configuring the parameter of the second-type BWP.

15 Claims, 18 Drawing Sheets

(51) Int. Cl.
*H04W 72/0453* (2023.01)
*H04W 72/23* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 2008/0227475 | A1* | 9/2008 | Suemitsu | H04W 72/54 455/509 |
| 2008/0240030 | A1* | 10/2008 | Kolding | H04L 1/0025 370/329 |
| 2010/0299113 | A1* | 11/2010 | Robinson | G06F 30/20 703/2 |
| 2011/0222505 | A1* | 9/2011 | Li | H04L 1/0003 370/330 |
| 2012/0275413 | A1 | 11/2012 | Hong et al. | |
| 2013/0051357 | A1* | 2/2013 | Yamagishi | H04W 16/16 370/329 |
| 2013/0159722 | A1* | 6/2013 | Goergen | H04N 1/32144 713/176 |
| 2014/0313912 | A1* | 10/2014 | Jongren | H04B 17/26 370/252 |
| 2014/0362766 | A1* | 12/2014 | Strait | H04L 25/03968 370/328 |
| 2016/0013878 | A1* | 1/2016 | Zhao | H04J 11/0023 370/329 |
| 2017/0150504 | A1* | 5/2017 | Soldati | H04W 72/20 |
| 2017/0188260 | A1* | 6/2017 | Zhou | H04W 72/0453 |
| 2017/0223733 | A1* | 8/2017 | Nakata | H04W 72/51 |
| 2018/0192101 | A1* | 7/2018 | Bilobrov | G06F 16/907 |
| 2019/0334680 | A1* | 10/2019 | Li | H04L 5/0051 |
| 2019/0349115 | A1* | 11/2019 | Lin | H04W 72/0446 |
| 2020/0059971 | A1* | 2/2020 | Qian | H04W 4/18 |
| 2020/0092872 | A1* | 3/2020 | Lin | H04W 72/0446 |
| 2020/0107294 | A1* | 4/2020 | Ji | H04W 76/11 |
| 2020/0389879 | A1* | 12/2020 | Zhang | H04L 5/0053 |

FOREIGN PATENT DOCUMENTS

| | | |
|---|---|---|
| CN | 108112080 A | 6/2018 |
| EP | 2538601 A2 | 12/2012 |
| EP | 2584828 A1 | 4/2013 |
| WO | 2010114233 A2 | 10/2010 |

OTHER PUBLICATIONS

3GPP TS 38.214 V15.1.0 (Mar.2018); 3rd Generation Partnership Project; Technical Specification Group Radio Access Network; NR;Physical layer procedures for data (Release 15);total 77 pages.
3GPP TS 38.331 V15.2.1 (Jun. 2018); 3rd Generation Partnership Project; Technical Specification Group Radio Access Network; NR;Radio Resource Control (RRC) protocol specification(Release 15);total 303 pages.
3GPP TSG RAN WG1 Meeting #93, R1-1806884, Dci size and interpretation for different BWP, Huawei, HiSilicon, Busan, Korea, May 21st 25th, 2018, total 5 pages.
3GPP TSG RAN WG1 Meeting #93, R1-1805893, Remaining issues on resource allocation and TBS, Huawei, HiSilicon, Busan, Korea, May 21st 25th, 2018, total 13 pages.
3GPP TSG RAN WG1 Meeting #93,R1-1805892, Remaining issues on bandwidth part and wideband operation, Huawei, HiSilicon, Busan, Korea, May 21st 25th, 2018, total 7 pages.
3GPP Ts 38.213 V15.1.0: 3rd Generation Partnership Project; Technical Specification Group Radio Access Network; NR;Physical layer procedures for control(Release 15), Mar. 2018, total 77 pages.
VIVO: Discussion on the remainingdetails on PT-RS 3GPP Draft; R1-1717478,Oct. 3, 2017,XP051352675, total 4 pages.

* cited by examiner

PARAMETER CONFIGURATION METHOD AND APPARATUS

CROSS-REFERENCE TO RELATED APPLICATIONS

This application is a continuation of International Application No. PCT/CN2019/090427, filed on Jun. 6, 2019, which claims priority to Chinese Patent Application No. 201810654748.1, filed on Jun. 22, 2018, the disclosures of the aforementioned applications being hereby incorporated by reference in their entireties.

TECHNICAL FIELD

Embodiments of this application relate to the communications field, and in particular, to a parameter configuration method and an apparatus.

BACKGROUND

A bandwidth part may be a part of system bandwidth. A first-type BWP includes consecutive frequency domain resources. When performing data transmission with a network device, a terminal device may transmit data on a frequency domain location of the first-type BWP based on a parameter of the first-type BWP. Currently, to improve spectrum efficiency of data transmission in a case of a discrete spectrum, an existing communication protocol defines a second-type BWP including discrete frequency domain resources, so that the terminal device can perform data transmission on nonconsecutive frequency domain resources, thereby improving spectrum efficiency. However, the prior art does not specify a technical solution of how to determine a frequency domain location and a parameter of the second-type BWP in the case of a discrete spectrum.

SUMMARY

Embodiments of this application provide a parameter configuration method and an apparatus, to resolve a problem of how to determine a frequency domain location and a parameter of a second-type bandwidth part (BWP) in a case of a discrete spectrum.

To achieve the foregoing objective, the embodiments of this application use the following technical solutions:

According to a first aspect, an embodiment of this application provides a parameter configuration method. The method may be applied to a terminal device, and/or the method may be applied to a communications apparatus that can support a terminal device in implementing the method, where for example, the communications apparatus includes a chip system, and/or the method may be applied to a network device, and/or the method may be applied to a communications apparatus that can support a network device in implementing the method, where for example, the communications apparatus includes a chip system. The method includes: for a parameter of a second-type BWP, determining a parameter value of the second-type BWP according to a parameter determining rule, where the parameter determining rule is determined based on a parameter type of the second-type BWP. The second-type BWP includes N frequency domain resources, N is a positive integer, and N is greater than or equal to 2. Therefore, the network device or the terminal device can determine the parameter of the second-type BWP in a case of a discrete spectrum, and receive or send data on the second-type BWP based on the parameter value of the second-type BWP, so that utilization of the discrete spectrum is effectively improved and system performance is improved. In addition, in comparison with design of performing data transmission by using a plurality of first-type BWPs, when a parameter of data transmission is indicated by using downlink control information (DCI), using one piece of DCI to schedule one second-type BWP in a case of using a second-type BWP for data transmission effectively reduces indication overheads of the DCI compared with using a plurality of pieces of DCI to schedule a plurality of first-type BWPs.

Parameter determining rules corresponding to different parameter types of second-type BWPs may be different or may be the same.

In one embodiment, the parameter determining rule is a first rule, and the determining a parameter value of the second-type BWP according to a parameter determining rule includes: determining the parameter value of the second-type BWP based on parameter values of M frequency domain resources, where the M frequency domain resources are M frequency domain resources in the N frequency domain resources, and M is an integer greater than or equal to 1 and less than or equal to N.

The parameter value of the second-type BWP may be determined based on the parameter values of the M frequency domain resources in the following embodiments:

Method 1 (a corresponding parameter determining rule is a rule A): The parameter value of the second-type BWP is determined based on identifiers of the M frequency domain resources and M parameter values of the M frequency domain resources; or the parameter value of the second-type BWP is determined based on identifiers of the M frequency domain resources and one or more of M parameter values of the M frequency domain resources.

For example, the determining the parameter value of the second-type BWP based on identifiers of the M frequency domain resources and M parameter values of the M frequency domain resources includes: determining the parameter value of the second-type BWP based on a parameter value of a frequency domain resource corresponding to a largest identifier in the identifiers of the M frequency domain resources (a corresponding parameter determining rule is a rule A1); determining the parameter value of the second-type BWP based on a parameter value of a frequency domain resource corresponding to a smallest identifier in the identifiers of the M frequency domain resources (a corresponding parameter determining rule is a rule A2); or determining the parameter value of the second-type BWP based on a parameter value of a frequency domain resource corresponding to an identifier in the identifiers of the M frequency domain resources, where the identifier is a preconfigured identifier, a received identifier, or a sent identifier (a corresponding parameter determining rule is a rule A3). When the method is described from the perspective of the terminal device, the received identifier may be an identifier received from the network device. Correspondingly, in the method, the network device sends information indicating the identifier or sends the identifier to the terminal device.

Method 2 (a corresponding parameter determining rule is a rule B): The parameter value of the second-type BWP is determined based on a largest parameter value in the parameter values of the M frequency domain resources (a corresponding parameter determining rule is a rule B1); the parameter value of the second-type BWP is determined based on a smallest parameter value in the parameter values of the M frequency domain resources (a corresponding parameter determining rule is a rule B2); or the parameter value of the second-type BWP is determined based on an average value of the parameter values of the M frequency domain resources (a corresponding parameter determining rule is a rule B3).

Method 3 (a corresponding parameter determining rule is a rule C): Candidate values of the parameter value of the second-type BWP are determined based on candidate values of the parameter values of the M frequency domain resources, including: determining the candidate values of the parameter value of the second-type BWP based on a union set of the candidate values of the parameter values of the M frequency domain resources (a corresponding parameter determining rule is a rule C1); or determining the candidate values of the parameter value of the second-type BWP based on an intersection set of the candidate values of the parameter values of the M frequency domain resources (a corresponding parameter determining rule is a rule C2).

In one embodiment, the parameter determining rule is a second rule, and the determining a parameter value of the second-type BWP according to a parameter determining rule includes: determining the parameter value of the second-type BWP based on a parameter value of a frequency domain resource used for initial access; or determining the parameter value of the second-type BWP based on a parameter value corresponding to a primary frequency domain resource. In the embodiments of this application, the primary frequency domain resource may be a frequency domain resource used to communicate a physical downlink control channel (PDCCH), or the primary frequency domain resource may be a frequency domain resource including common search space of a PDCCH.

It should be noted that when the parameter value of the second-type BWP is determined based on the parameter value of the frequency domain resource used for initial access, the parameter value of the primary frequency domain resource, or a parameter value of a default frequency domain resource, the frequency domain resource used for initial access, the primary frequency domain resource, or the default frequency domain resource may be a frequency domain resource that does not belong to the second-type BWP, or may be a frequency domain resource that belongs to the second-type BWP. This is not limited in this application. It is assumed that the second-type BWP includes a total of two frequency domain resources: a first frequency domain resource and a second frequency domain resource. If the first frequency domain resource is a frequency domain resource used for initial access, a parameter value of the first frequency domain resource is determined as the parameter value of the second-type BWP. If the second frequency domain resource is a frequency domain resource used for initial access, a parameter value of the second frequency domain resource is determined as the parameter value of the second-type BWP.

In one embodiment, the parameter value of the second-type BWP may be predefined according to a protocol, or the parameter value of the second-type BWP may be determined based on an indication of received signaling, or the parameter value of the second-type BWP may be preset. When the method is described from the perspective of the terminal device, the received signaling may be signaling received from the network device. Correspondingly, in the method, the network device sends the signaling to the terminal device.

It should be noted that, when the method is described from the perspective of the terminal device, the terminal device may preconfigure parameter values of the N frequency domain resources and identifiers corresponding to the N frequency domain resources. Before determining the parameter value of the second-type BWP based on the parameter values of the M frequency domain resources, the terminal device may receive M frequency domain resource identifiers sent by the network device, and obtain the parameter values of the M frequency domain resources based on the M frequency domain resource identifiers, where frequency domain resources corresponding to the M frequency domain resource identifiers are frequency domain resources in the N frequency domain resources preconfigured by the terminal device. Alternatively, the terminal device may receive the parameter values that are of the M frequency domain resources and that are sent by the network device.

In one embodiment, the parameter type of the second-type BWP is a first type, and the parameter determining rule is one rule; or the parameter type of the second-type BWP is a second type, and the parameter determining rule is another rule. The one rule and the another rule each may be the first rule or any sub-rule of the first rule (for example, the rule A, the rule A1, the rule A2, the rule A3, the rule B, the rule B1, the rule B2, the rule B3, the rule C, the rule C1, or the rule C2) or the second rule, and the one rule is different from the another rule.

In one embodiment, the first type or the second type includes a data scrambling identifier, a downlink demodulation reference signal (DMRS) configuration, a transmission configuration indication (TCI) state configuration, a virtual resource block (VRB) to physical resource block (PRB) interleaver, a resource allocation type, a physical downlink shared channel (PDSCH) time domain resource allocation list, a PDSCH aggregation factor, a rate matching pattern, an RBG size, a modulation and coding scheme (MCS) table configuration, a maximum quantity of codewords during DCI scheduling, a precoding RB aggregation type, a zero power CSI-RS resource, a transmission configuration, uplink power control, a frequency hopping configuration, a frequency hopping offset, transform precoding, a codebook subset configuration, a maximum rank value, carrying uplink control information in a physical uplink shared channel (PUSCH), an offset value set, a scale factor, a period, a quantity of HARQ processes, a physical uplink control channel (PUCCH) resource identifier, a power configuration parameter, a power parameter, a quantity of repetition times, a redundancy version of repeated transmission, RRC configured uplink scheduling information, a time domain offset, a path loss reference indication, a time domain resource allocation, a frequency domain resource allocation, an antenna port indication, DMRS sequence initialization, precoding and a quantity of layers, an SRS resource indication, a modulation scheme, a bitrate, and a TBS, a TBS overhead, or a frequency hopping offset configuration. The first type is different from the second type.

In one embodiment, the parameter value may be determined by using Method 1 if the parameter type is one parameter of or a combination of a plurality of parameters of a data scrambling identifier, a downlink demodulation reference signal (DMRS) configuration, a transmission configuration indication (TCI) state configuration, a VRB to PRB interleaver, a resource allocation type, a physical downlink shared channel (PDSCH) time domain resource allocation list, a PDSCH aggregation factor, a rate matching pattern, an RBG size, an MCS table configuration, a maximum quantity of codewords during DCI scheduling, a precoding RB aggregation type, a zero power CSI-RS resource, a transmission configuration, uplink power control, a frequency hopping configuration, a frequency hopping offset, a transform precoding, a codebook subset configuration, a maximum rank value, carrying uplink control information in a physical uplink shared channel (PUSCH), an offset value set, a scale factor, a period, a quantity of HARQ processes, a physical uplink control channel (PUCCH) resource identifier, a power configuration parameter, a power parameter, a quantity of repetition times, a redundancy version of repeated transmission, RRC configured uplink scheduling information, a time domain offset, a path loss reference indication, a time domain resource allocation, a frequency domain resource allocation, an antenna port indication, DMRS sequence initialization, precoding and a quantity of layers, an SRS resource indication, a modulation scheme, a bitrate, and a TBS, a TBS overhead, and a frequency hopping offset configuration.

In one embodiment, the parameter value may be determined by using Method 2 if the parameter type is one piece of information of or a combination of a plurality of pieces of information of a data scrambling identifier, a downlink DMRS configuration, a VRB to PRB interleaver, a PDSCH aggregation factor, a maximum quantity of codewords during DCI scheduling, a precoding RB aggregation type, uplink power control, a frequency hopping offset, carrying uplink control information in a PUSCH, a scale factor, a period, a quantity of HARQ processes, a power configuration parameter, a power parameter, a quantity of repetition times, RRC configured uplink scheduling information, a time domain offset, precoding and a quantity of layers, an SRS resource indication, a modulation scheme, a bitrate, and a TBS, a TBS overhead, and a frequency hopping offset configuration In one embodiment, the parameter value may be determined by using Method 3 if the parameter type is one piece of information of or a combination of a plurality of pieces of information of a TCI state configuration, a PDSCH time domain resource allocation list, a rate matching pattern, an RBG size, a zero power CSI-RS resource, a codebook subset configuration, a maximum rank value, carrying uplink control information in a PUSCH, an offset value set, a period, a PUCCH resource identifier, a redundancy version of repeated transmission, RRC configured uplink scheduling information, a path loss reference indication, a time domain resource allocation, a frequency domain resource allocation, an antenna port indication, DMRS sequence initialization, precoding and a quantity of layers, an SRS resource indication, a TBS overhead, and a modulation scheme, a bitrate, and a TBS.

According to a second aspect, an embodiment of this application further provides a resource configuration method. The method may be applied to a terminal device, and/or the method may be applied to a communications apparatus that can support a terminal device in implementing the method, where for example, the communications apparatus includes a chip system, and/or the method may be applied to a network device, and/or the method may be applied to a communications apparatus that can support a network device in implementing the method, where for example, the communications apparatus includes a chip system. The method includes: determining a resource configuration of a second-type BWP, and determining a resource location of the second-type BWP based on the resource configuration of the second-type BWP. The resource configuration includes at least one reference point, at least one second offset offset 2, and N pieces of frequency domain resource information. The N pieces of frequency domain resource information correspond to N frequency domain resources, the second-type BWP includes the N frequency domain resources, N is a positive integer, and N is greater than or equal to 2. When the method is described from the perspective of the terminal device, the determining a resource configuration of a second-type BWP may be receiving the resource configuration that is of the second-type BWP and that is sent by the network device. Correspondingly, the network device sends the resource configuration of the second-type BWP to the terminal device. Therefore, according to the resource configuration method provided in this embodiment of this application, the network device or the terminal device can determine the frequency domain location of the second-type BWP in a case of a discrete spectrum, and receive or send data on the second-type BWP based on a parameter value of the second-type BWP, so that utilization of the discrete spectrum is effectively improved and system performance is improved.

According to a third aspect, an embodiment of this application further provides a resource configuration method. The method may be applied to a terminal device, and/or the method may be applied to a communications apparatus that can support a terminal device in implementing the method, where for example, the communications apparatus includes a chip system, and/or the method may be applied to a network device, and/or the method may be applied to a communications apparatus that can support a network device in implementing the method, where for example, the communications apparatus includes a chip system. The method includes: determining a parameter value of a second-type BWP based on identifiers of M frequency domain resources and M parameter values of the M frequency domain resources, and receiving or sending data on the second-type BWP based on the parameter value of the second-type BWP. The second-type BWP includes N frequency domain resources, N is a positive integer, N is greater than or equal to 2, the M frequency domain resources are M frequency domain resources in the N frequency domain resources, and M is an integer greater than or equal to 1 and less than or equal to N. In the embodiments of this application or the summary, the receiving or sending data on the second-type BWP based on the parameter value of the second-type BWP may be further described as receiving or sending data on the second-type BWP based on the parameter value of the second-type BWP by using a corresponding parameter.

For example, the determining a parameter value of a second-type BWP based on identifiers of M frequency domain resources and M parameter values of the M frequency domain resources includes: determining the parameter value of the second-type BWP based on a parameter value of a frequency domain resource corresponding to a largest identifier in the identifiers of the M frequency domain resources; determining the parameter value of the second-type BWP based on a parameter value of a frequency domain resource corresponding to a smallest identifier in the identifiers of the M frequency domain resources; or determining the parameter value of the second-type BWP based on a parameter value of a frequency domain resource corresponding to an identifier in the identifiers of the M frequency domain resources, where the identifier is a preconfigured identifier or a received identifier. When the method is described from the perspective of the terminal device, the received identifier may be an identifier received from the network device. Correspondingly, the network device sends information indicating the identifier.

According to a fourth aspect, an embodiment of this application further provides a resource configuration method. The method may be applied to a terminal device, and/or the method may be applied to a communications apparatus that can support a terminal device in implementing the method, where for example, the communications apparatus includes a chip system, and/or the method may be applied to a network device, and/or the method may be applied to a communications apparatus that can support a network device in implementing the method, where for example, the communications apparatus includes a chip system. The method includes: determining a parameter value of a second-type BWP based on a largest parameter value in parameter values of M frequency domain resources, or determining a parameter value of a second-type BWP based on a smallest parameter value in parameter values of M frequency domain resources, or determining a parameter value of a second-type BWP based on an average value of parameter values of M frequency domain resources, and receiving or sending data on the second-type BWP based on the parameter value of the second-type BWP. The second-type BWP includes N frequency domain resources, N is a positive integer, N is greater than or equal to 2, the M frequency domain resources are M frequency domain resources in the N frequency domain resources, and M is an integer greater than or equal to 1 and less than or equal to N.

According to a fifth aspect, an embodiment of this application further provides a resource configuration method. The method may be applied to a terminal device, and/or the method may be applied to a communications apparatus that can support a terminal device in implementing the method, where for example, the communications apparatus includes a chip system, and/or the method may be applied to a network device, and/or the method may be applied to a communications apparatus that can support a network device in implementing the method, where for example, the communications apparatus includes a chip system. The method includes: determining candidate values of a parameter value of a second-type BWP based on candidate values of parameter values of M frequency domain resources, and receiving or sending data on the second-type BWP based on the candidate values of the parameter value of the second-type BWP. The second-type BWP includes N frequency domain resources, N is a positive integer, N is greater than or equal to 2, the M frequency domain resources are M frequency domain resources in the N frequency domain resources, and M is an integer greater than or equal to 1 and less than or equal to N. In one embodiment, the receiving or sending data on the second-type BWP based on the candidate values of the parameter value of the second-type BWP includes: determining the parameter value of the second-type BWP from the candidate values of the parameter value of the second-type BWP, and receiving or sending the data on the second-type BWP based on the parameter value of the second-type BWP. The parameter value of the second-type BWP may be determined from the candidate values of the parameter value of the second-type BWP through preconfiguration, or the network device may indicate the parameter value of the second-type BWP to the terminal device.

For example, the determining candidate values of a parameter value of a second-type BWP based on candidate values of parameter values of M frequency domain resources includes: determining the candidate values of the parameter value of the second-type BWP based on a union set of the candidate values of the parameter values of the M frequency domain resources; or determining the candidate values of the parameter value of the second-type BWP based on an intersection set of the candidate values of the parameter values of the M frequency domain resources.

According to a sixth aspect, an embodiment of this application further provides a resource configuration method. The method may be applied to a terminal device, and/or the method may be applied to a communications apparatus that can support a terminal device in implementing the method, where for example, the communications apparatus includes a chip system, and/or the method may be applied to a network device, and/or the method may be applied to a communications apparatus that can support a network device in implementing the method, where for example, the communications apparatus includes a chip system. The method includes: determining a parameter value of a second-type BWP based on a parameter value of a frequency domain resource used for initial access, or determining a parameter value of a second-type BWP based on a parameter value corresponding to a primary frequency domain resource, and receiving or sending data on the second-type BWP based on the parameter value of the second-type BWP. The second-type BWP includes N frequency domain resources, N is a positive integer, and N is greater than or equal to 2. In one embodiment, the frequency domain resource used for initial access is a frequency domain resource in the N frequency domain resources, or the primary frequency domain resource is a frequency domain resource in the N frequency domain resources.

In the method involved in the third aspect to the sixth aspect, a parameter of the second-type BWP may be a data scrambling identifier, a downlink demodulation reference signal (DMRS) configuration, a transmission configuration indication (TCI) state configuration, a virtual resource block (VRB) to physical resource block (PRB) interleaver, a resource allocation type, a physical downlink shared channel (PDSCH) time domain resource allocation list, a PDSCH aggregation factor, a rate matching pattern, an RBG size, a modulation and coding scheme (MCS) table configuration, a maximum quantity of codewords during DCI scheduling, a precoding RB aggregation type, a zero power CSI-RS resource, a transmission configuration, uplink power control, a frequency hopping configuration, a frequency hopping offset, transform precoding, a codebook subset configuration, a maximum rank value, carrying uplink control information in a physical uplink shared channel (PUSCH), an offset value set, a scale factor, a period, a quantity of HARQ processes, a physical uplink control channel (PUCCH) resource identifier, a power configuration parameter, a power parameter, a quantity of repetition times, a redundancy version of repeated transmission, RRC configured uplink scheduling information, a time domain offset, a path loss reference indication, a time domain resource allocation, a frequency domain resource allocation, an antenna port indication, DMRS sequence initialization, precoding and a quantity of layers, an SRS resource indication, a modulation scheme, a bitrate, and a TBS, a TBS overhead, or a frequency hopping offset configuration.

According to a seventh aspect, an embodiment of this application further provides a communications apparatus, configured to implement the methods described in the first aspect and the third aspect to the sixth aspect. The communications apparatus is a terminal device or a communications apparatus that supports a terminal device in implementing the methods described in the first aspect and the third aspect to the sixth aspect, where for example, the communications apparatus includes a chip system, and/or the communications apparatus is a network device or a communications apparatus that supports a network device in implementing the methods described in the first aspect and the third aspect to the sixth aspect, where for example, the communications apparatus includes a chip system. For example, the communications apparatus includes a processing unit. The processing unit is configured to: for a parameter of a second-type bandwidth part BWP, determine a parameter determining rule based on a parameter type of the second-type BWP, where the second-type BWP includes N frequency domain resources, N is a positive integer, and N is greater than or equal to 2; and the processing unit is further configured to determine a parameter value of the second-type BWP according to the parameter determining rule.

In one embodiment, the parameter determining rule and/or a method for determining the parameter value of the second-type BWP according to the parameter determining rule are or is the same as the corresponding description in the first aspect, and details are not described herein again.

In one embodiment, the communications apparatus may further include a communications interface, configured to send or receive data.

According to an eighth aspect, an embodiment of this application further provides a communications apparatus, configured to implement the method described in the second aspect. The communications apparatus is a terminal device and/or a communications apparatus that supports a terminal device in implementing the method described in the second aspect, where for example, the communications apparatus includes a chip system, and/or the communications apparatus is a network device or a communications apparatus that supports a network device in implementing the method described in the second aspect, where for example, the communications apparatus includes a chip system. For example, the communications apparatus includes a processing unit. The processing unit is configured to determine a resource configuration of a second-type BWP, where the resource configuration includes at least one reference point, at least one second offset offset 2, and N pieces of frequency domain resource information, the N pieces of frequency domain resource information correspond to N frequency domain resources, the second-type BWP includes the N frequency domain resources, N is a positive integer, and N is greater than or equal to 2; and the processing unit is further configured to determine a resource location of the second-type BWP based on the resource configuration of the second-type BWP.

In one embodiment, the communications apparatus may further include a communications interface, configured to send or receive data.

It should be noted that the function modules in the seventh aspect and the eighth aspect may be implemented by hardware, or may be implemented by hardware by executing corresponding software. The hardware or the software includes one or more modules corresponding to the foregoing functions. For example, a transceiver is configured to implement functions of a receiving unit and a sending unit, a processor is configured to implement a function of the processing unit, and a memory is configured to store a program instruction used by the processor to process the method in the embodiments of this application. The processor, the transceiver, and the memory are connected and implement mutual communication by using a bus. For details, refer to functions of behaviors of the terminal device or the network device in the methods described in the first aspect to the sixth aspect.

According to a ninth aspect, an embodiment of this application further provides a communications apparatus, configured to implement the methods described in the first aspect and the third aspect to the sixth aspect. The communications apparatus is a terminal device or a communications apparatus that supports a terminal device in implementing the methods described in the first aspect and the third aspect to the sixth aspect, where for example, the communications apparatus includes a chip system, or the communications apparatus is a network device or a communications apparatus that supports a network device in implementing the methods described in the first aspect and the third aspect to the sixth aspect, where for example, the communications apparatus includes a chip system. For example, the communications apparatus includes a processor, configured to implement functions in the methods described in the first aspect and the third aspect to the sixth aspect. The communications apparatus may further include a memory, configured to store a program instruction and data. The memory is coupled to the processor, and the processor may invoke and execute the program instruction stored in the memory, to implement functions in the method described in the first aspect. The communications apparatus may further include a communications interface, and the communications interface is used by the communications apparatus to communicate with another device. For example, if the communications apparatus is a network device, the another device is a terminal device. If the communications apparatus is a terminal device, the another device is a network device.

In one embodiment, the communications apparatus includes a communications interface, and the communications interface is used by the communications apparatus to communicate with another apparatus. For example, the communications interface may be a transceiver, and the transceiver is configured to send or receive data. A memory is configured to store a program instruction. A processor is configured to: determine a parameter determining rule based on a parameter type of a second-type BWP, and determine a parameter value of the second-type BWP according to the parameter determining rule. The second-type BWP includes N frequency domain resources, N is a positive integer, and N is greater than or equal to 2.

In one embodiment, the parameter determining rule and a method for determining the parameter value of the second-type BWP according to the parameter determining rule are the same as the corresponding description in the first aspect, and details are not described herein again.

According to a tenth aspect, an embodiment of this application further provides a communications apparatus, configured to implement the method described in the second aspect. The communications apparatus is a terminal device or a communications apparatus that supports a terminal device in implementing the method described in the second aspect, where for example, the communications apparatus includes a chip system, or the communications apparatus is a network device or a communications apparatus that supports a network device in implementing the method described in the second aspect, where for example, the communications apparatus includes a chip system. For example, the communications apparatus includes a processor, configured to implement functions in the method described in the second aspect. The communications apparatus may further include a memory, configured to store a program instruction and data. The memory is coupled to the processor, and the processor may invoke and execute the program instruction stored in the memory, to implement the functions in the method described in the second aspect. The communications apparatus may further include a communications interface, and the communications interface is used by the communications apparatus to communicate with another device. For example, if the communications apparatus is a network device, the another device is a terminal device. If the communications apparatus is a terminal device, the another device is a network device.

In one embodiment, the communications apparatus includes a communications interface, and the communications interface is used by the communications apparatus to communicate with another apparatus. For example, the communications interface may be a transceiver. A memory is configured to store a program instruction. A processor is configured to: determine a resource configuration of a second-type BWP, where the resource configuration includes at least one reference point, at least one second offset offset 2, and N pieces of frequency domain resource information, the N pieces of frequency domain resource information correspond to N frequency domain resources, the second-type BWP includes the N frequency domain resources, N is a positive integer, and N is greater than or equal to 2; and determine a resource location of the second-type BWP based on the resource configuration of the second-type BWP.

According to an eleventh aspect, an embodiment of this application further provides a computer-readable storage medium, including a computer software instruction. When the computer software instruction is run on a communications apparatus, the communications apparatus performs the method described in any one of the first aspect to the sixth aspect.

According to a twelfth aspect, an embodiment of this application further provides a computer program product including an instruction. When the computer program product runs on a communications apparatus, the communications apparatus performs the method described in any one of the first aspect to the sixth aspect.

According to a thirteenth aspect, an embodiment of this application provides a chip system. The chip system includes a processor, may further include a memory, and is configured to implement functions of the network device or the terminal device in the foregoing methods. The chip system may include a chip, or may include a chip and another discrete component.

According to a fourteenth aspect, an embodiment of this application further provides a communications system. The communications system includes the terminal device described in the seventh aspect or the communications apparatus, described in the seventh aspect, that supports the terminal device in implementing the methods described in the first aspect and the third aspect to the sixth aspect, and the network device described in the seventh aspect or the communications apparatus, described in the seventh aspect, that supports the network device in implementing the methods described in the first aspect and the third aspect to the sixth aspect;

the communications system includes the terminal device described in the ninth aspect or the communications apparatus, described in the ninth aspect, that supports the terminal device in implementing the methods described in the first aspect and the third aspect to the sixth aspect, and the network device described in the ninth aspect or the communications apparatus, described in the ninth aspect, that supports the network device in implementing the methods described in the first aspect and the third aspect to the sixth aspect;

the communications system includes the terminal device described in the eighth aspect or the communications apparatus, described in the eighth aspect, that supports the terminal device in implementing the method described in the second aspect, and the network device described in the eighth aspect or the communications apparatus, described in the eighth aspect, that supports the network device in implementing the method described in the second aspect; or the communications system includes the terminal device described in the tenth aspect or the communications apparatus, described in the tenth aspect, that supports the terminal device in implementing the method described in the second aspect, and the network device described in the tenth aspect or the communications apparatus, described in the tenth aspect, that supports the network device in implementing the method described in the second aspect.

In addition, for technical effects brought by a design manner of any one of the foregoing aspects, refer to technical effects brought by different design manners of the first aspect and the second aspect, and details are not described herein again.

In the embodiments of this application, names of the terminal device, the network device, and the communications apparatus constitute no limitation on the devices. In actual implementation, these devices may have other names. Provided that functions of each device are similar to those in the embodiments of this application, the devices fall within the scope of the claims of this application and their equivalent technologies.

DESCRIPTION OF EMBODIMENTS

In the specification, claims, and the accompanying drawings of this application, the terms "first", "second", "third" and the like are intended to distinguish between different objects but not to limit a particular order.

In embodiments of this application, the word such as "example" or "for example" is used to represent giving an example, an illustration, or a description. Any embodiment or design solution described by using "example" or "for example" in the embodiments of this application should not be explained as being more preferred or having more advantages than another embodiment or design solution. Exact use of the word such as "example" or "for example" is used to present a related concept in a particular manner.

To make descriptions of the following embodiments clear and concise, the following briefly describes related technologies first.

A BWP may be a part of system bandwidth. In some scenarios, the BWP may also be referred to as a bandwidth resource, a carrier bandwidth part (CBWP), a frequency resource part, a part of a frequency resource, a subband, a narrowband, or the like.

Figure 1:
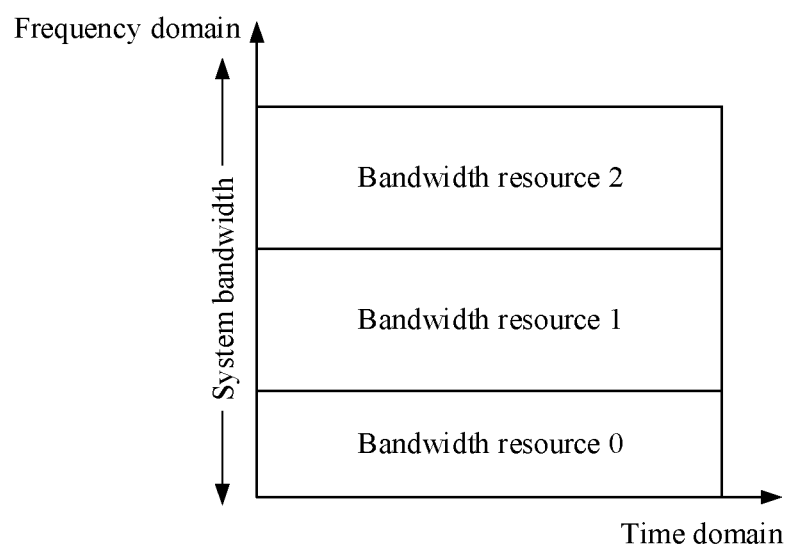
FIG. 1 is an example diagram of bandwidth resources in system bandwidth according to an embodiment of this application.

FIG. 1 is an example diagram of bandwidth resources in system bandwidth according to an embodiment of this application. As shown in FIG. 1, the system bandwidth includes three different bandwidth resources, namely, a bandwidth resource 0, a bandwidth resource 1, and a bandwidth resource 2. Any one of the bandwidth resource 0, the bandwidth resource 1, and the bandwidth resource 2 may be considered as the foregoing bandwidth part. In actual application, the system bandwidth may include a plurality of bandwidth resources. For different bandwidth resources, for example, for the bandwidth resource 0 and the bandwidth resource 1, frequency domain resources of the bandwidth resource 0 and the bandwidth resource 1 may partially or totally overlap or not overlap. For example, in a communications system based on an orthogonal frequency division multiplexing (OFDM) technology, the frequency domain resources of the bandwidth resource 0 and the bandwidth resource 1 totally overlap, but frame structures (for example, subcarrier spacings (SCS) and/or cyclic prefix (CP) lengths) are different. This is not limited in the embodiments of this application.

In frequency domain, each subband for which different numerologies are configured may be referred to as one BWP. The numerology is defined as a combination of a subcarrier spacing and a cyclic prefix. There may be two types of BWPs based on types of frequency domain resources included in the BWPs. The two types include a first-type BWP and a second-type BWP. In some scenarios, the frequency domain resource may also be referred to as a frequency resource.

Figure 2:
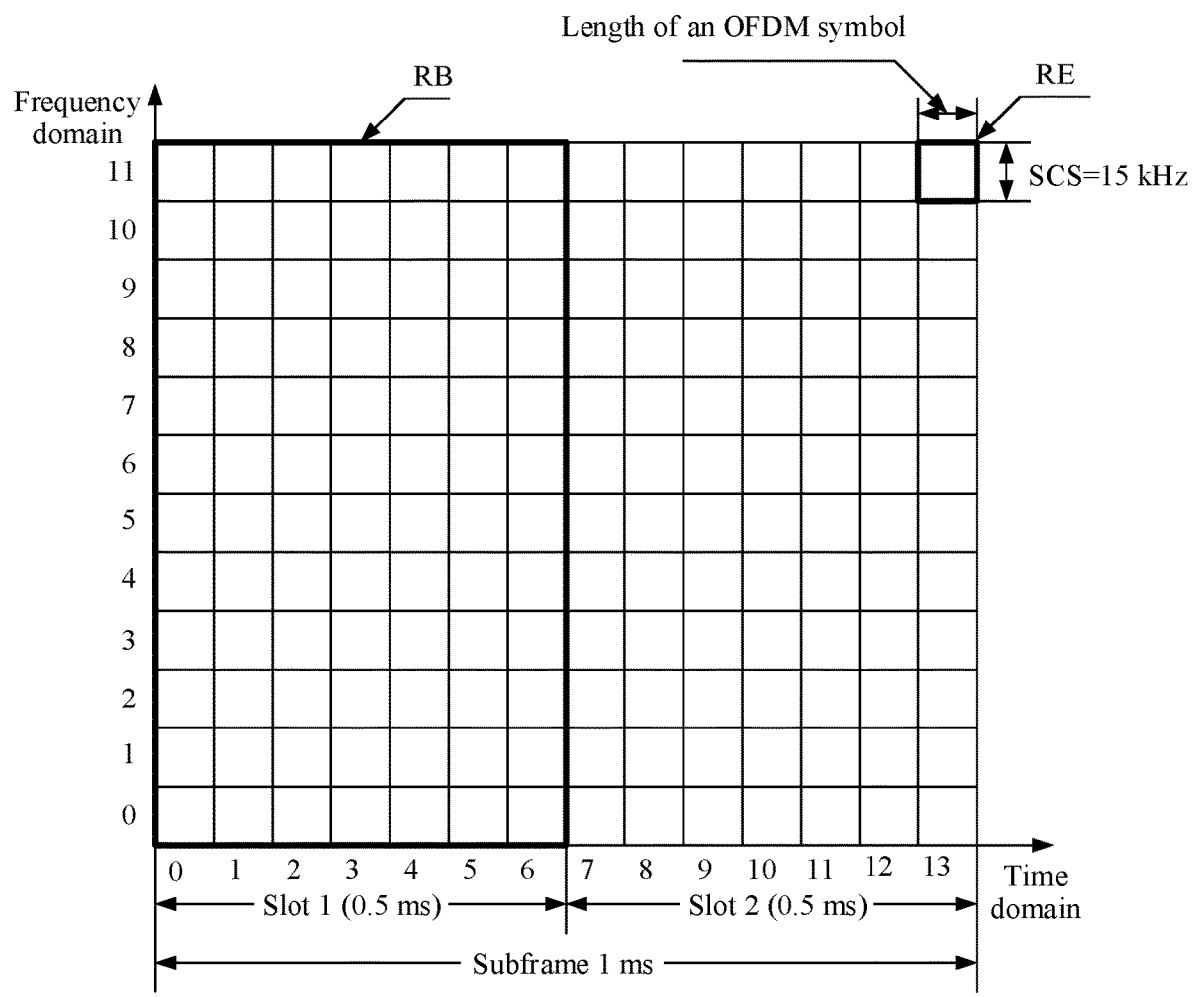
FIG. 2 is an example structural diagram of time-frequency resource grids according to an embodiment of this application.

The first-type BWP includes consecutive frequency domain resources, and a unit of the frequency domain resource may be subcarrier, resource block (RB), resource block group (RBG), hertz, or the like. One RB may include subcarriers whose quantity is a positive integer (for example, 12), and one RBG may include RBs whose quantity is a positive integer. FIG. 2 is an example structural diagram of time-frequency resource grids according to an embodiment of this application. A minimum unit in frequency domain is subcarrier, and a subcarrier spacing between adjacent subcarriers may be 15 kHz, 30 kHz, 60 kHz, 120 kHz, 240 kHz, 480 kHz, or the like. A minimum unit in time domain is symbol, one or more symbols may be included in one slot, and one slot may be 0.5 milliseconds (ms), 1 ms, or the like. Lengths of slots may be different or the same in a case of different subcarrier spacings, and this is not limited in this application. Slots may include different quantities of symbols or a same quantity of symbols in the case of different subcarrier spacings, and this is not limited in this application. Each small grid in the time-frequency resource grids represents one resource element (RE). Bandwidth of one RE in frequency domain is one subcarrier, for example, may be 15 kHz, in other words, is the same as the SCS, and one RE has a length of one OFDM symbol in time domain. 12 consecutive subcarriers in frequency domain may be included in one resource block (RB). Two slots may be included in one subframe. Alternatively, in the case of different subcarrier spacings, a correspondence between a slot and a subframe may also vary. For example, in a case of a normal cyclic prefix (NCP), for a 15 kHz subcarrier spacing, one slot may include seven OFDM symbols or 14 symbols. Details are shown in Table 1. When a subcarrier spacing is 15 kHz, one slot may include 14 symbols, one radio frame may include 10 slots, and one subframe may include one slot. When a subcarrier spacing is 30 kHz, one slot may include 14 symbols, one radio frame may include 20 slots, and one subframe may include two slots. When a subcarrier spacing is 60 kHz, one slot may include 14 symbols, one radio frame may include 40 slots, and one subframe may include four slots. When a subcarrier spacing is 120 kHz, one slot may include 14 symbols, one radio frame may include 80 slots, and one subframe may include eight slots. When a subcarrier spacing is 240 kHz, one slot may include 14 symbols, one radio frame may include 160 slots, and one subframe may include 16 slots.

TABLE 1

| μ | Subcarrier spacing | $N_{symb}^{slot}$ | $N_{slot}^{frame, \mu}$ | $N_{slot}^{subframe, \mu}$ |
|---|---|---|---|---|
| 0 | 15 | 14 | 10 | 1 |
| 1 | 30 | 14 | 20 | 2 |
| 2 | 60 | 14 | 40 | 4 |
| 3 | 120 | 14 | 80 | 8 |
| 4 | 240 | 14 | 160 | 16 |

In a case of an extended cyclic prefix (ECP), for a 60 kHz subcarrier spacing, one slot may include six OFDM symbols or 12 symbols. For example, for a 60 kHz subcarrier spacing, one radio frame may include 40 slots, and one subframe may include four slots. Each OFDM symbol may include a data part and a CP.

Figure 3:
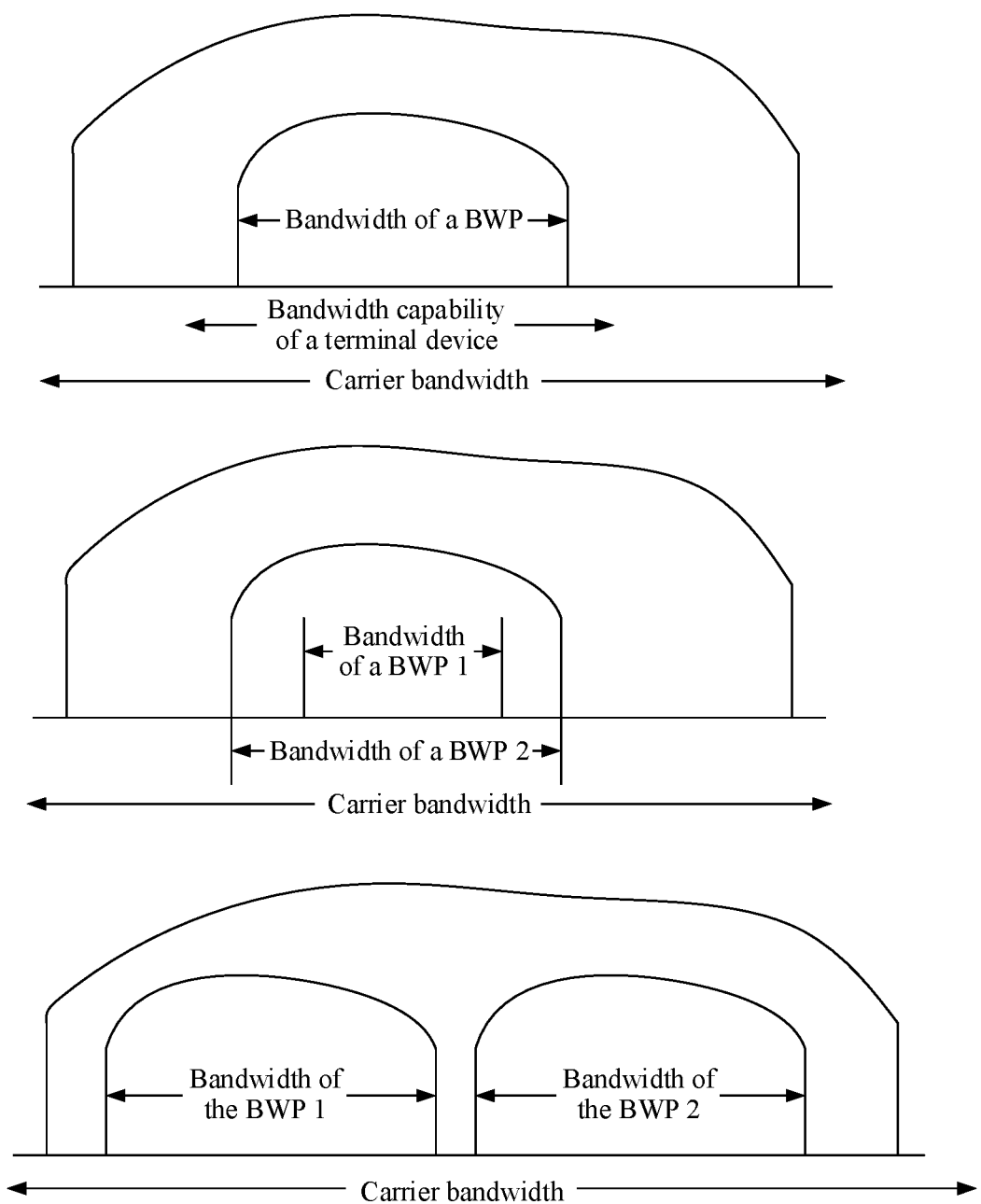
FIG. 3 is an example structural diagram of a first-type BWP according to an embodiment of this application.

For example, in a fifth generation (5G) new radio (NR) system, a network device can configure a maximum of four first-type BWPs for a terminal device in one serving cell, and one of the first-type BWPs may be activated to perform data transmission. The terminal device performs data transceiving on the activated first-type BWP. The first-type BWP may be consecutive RB resources defined on one carrier, in other words, resources of one first-type BWP are located on one carrier resource. FIG. 3 is an example structural diagram of a first-type BWP according to an embodiment of this application.

The second-type BWP may also be referred to as an X-BWP, a BWP bundle, a BWP set, or a BWP group. The second-type BWP includes N frequency domain resources, N is a positive integer, and N is greater than or equal to 2. For example, the N frequency domain resources may be N first-type BWPs, in other words, the second-type BWP includes N first-type BWPs.

Figure 4:
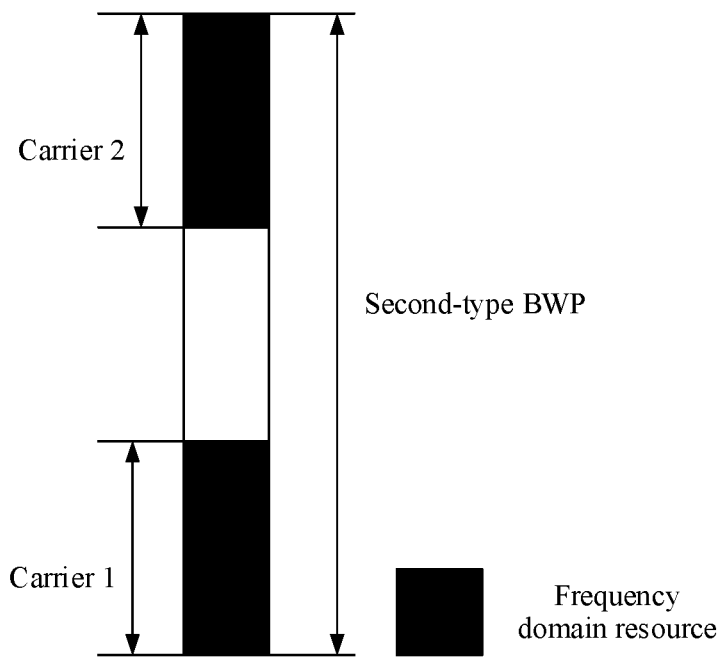
FIG. 4 is an example structural diagram of a second-type BWP according to an embodiment of this application.
Figure 5:
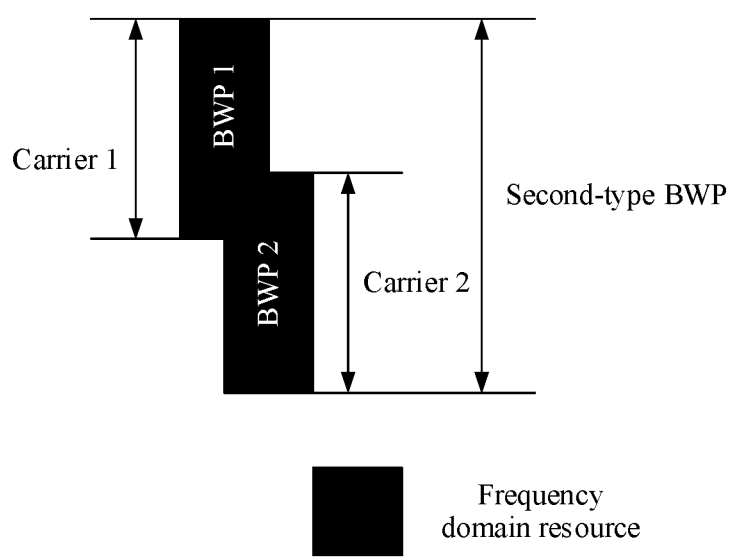
FIG. 5 is an example structural diagram of overlap between frequency domain resources according to an embodiment of this application.

It should be noted that for the second-type BWP, the N frequency domain resources may be nonconsecutive or discrete. The discrete frequency domain resources may also be described as a discrete spectrum. It may be understood that any two of N nonconsecutive frequency domain resources are nonconsecutive. Alternatively, the N frequency domain resources include at least two nonconsecutive frequency domain resources. In addition, N nonconsecutive frequency domain resources may be located in one component carrier (CC), or may be located in a plurality of CCs. The component carrier may also be referred to as a carrier. The second-type BWP may include resources of a plurality of CCs. Data transmitted by using the second-type BWP may be transmitted on nonconsecutive frequency domain resources, or may be transmitted on a plurality of CCs. Performing transmission on a plurality of CCs implements cross-CC data transmission in a case of a discrete spectrum, and also effectively reduces indication overheads of DCI compared with design of performing data transmission by using a plurality of first-type BWPs in which scheduling overheads are relatively large. In the embodiments of this application, transmission may include uplink transmission and/or downlink transmission. For example, transmission may include sending a signal to the terminal device by the network device and/or sending a signal to the network device by the terminal device. FIG. 4 is an example structural diagram of a second-type BWP according to an embodiment of this application. In one embodiment, two of N frequency domain resources may overlap. FIG. 5 is an example structural diagram of overlap between frequency domain resources according to an embodiment of this application.

Figure 6:
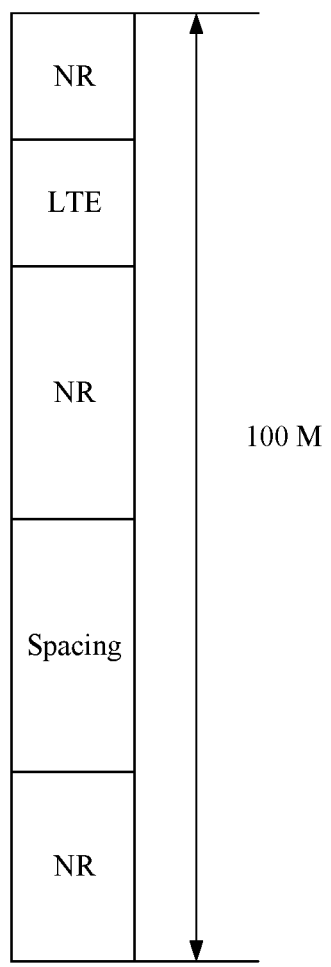
FIG. 6 is an example structural diagram of a discrete spectrum according to an embodiment of this application.

In the embodiments of this application, the discrete spectrum may be a plurality of nonconsecutive spectrum resources. For example, an operator has many discrete spectrums in a low frequency band. A 1.8 GHz frequency band of an operator A in a case of time division duplex (TDD) is used as an example. A shared 7.5 MHz continuous spectrum is configured for long term evolution (LTE) and NR, and another 5 MHz continuous spectrum may be configured for NR. Therefore, it may be considered that 12.5 MHz bandwidth is equivalently configured for NR. However, for NR, there is another 5 MHz spectrum between the 7.5 MHz spectrum and the 5 MHz spectrum that is occupied by an operator B. FIG. 6 is an example structural diagram of a discrete spectrum according to an embodiment of this application. For example, there is a frequency domain resource used for LTE and an idle frequency domain resource between frequency domain resources used for NR.

To resolve a problem of how to determine a frequency domain location and a parameter of a second-type BWP in a case of a discrete spectrum, an embodiment of this application provides a bandwidth part configuration method. A basic principle of the method is as follows: For the parameter of the second-type BWP, a parameter value of the second-type BWP may be determined according to a parameter determining rule, where the parameter determining rule is determined based on a parameter type of the second-type BWP. In addition, for a resource of the second-type BWP, a resource configuration of the second-type BWP is determined, and the resource location of the second-type BWP is determined based on the resource configuration of the second-type BWP. The resource configuration includes at least one reference point, at least one second offset offset 2, and N pieces of frequency domain resource information. The N pieces of frequency domain resource information correspond to N frequency domain resources, the second-type BWP includes the N frequency domain resources, N is a positive integer, and N is greater than or equal to 2. The method may be applied to a terminal device, or the method may be applied to a communications apparatus that can support a terminal device in implementing the method, where for example, the communications apparatus includes a chip system, or the method may be applied to a network device, or the method may be applied to a communications apparatus that can support a network device in implementing the method, where for example, the communications apparatus includes a chip system. Therefore, according to the bandwidth part configuration method provided in the embodiments of this application, the network device or the terminal device can determine a frequency domain location and the parameter of the second-type BWP in a case of a discrete spectrum, and receive or send data on the frequency domain location of the second-type BWP based on the parameter value of the second-type BWP, so that utilization of the discrete spectrum is effectively improved and system performance is improved.

The following describes in detail implementations of the embodiments of this application with reference to the accompanying drawings.

Figure 7:
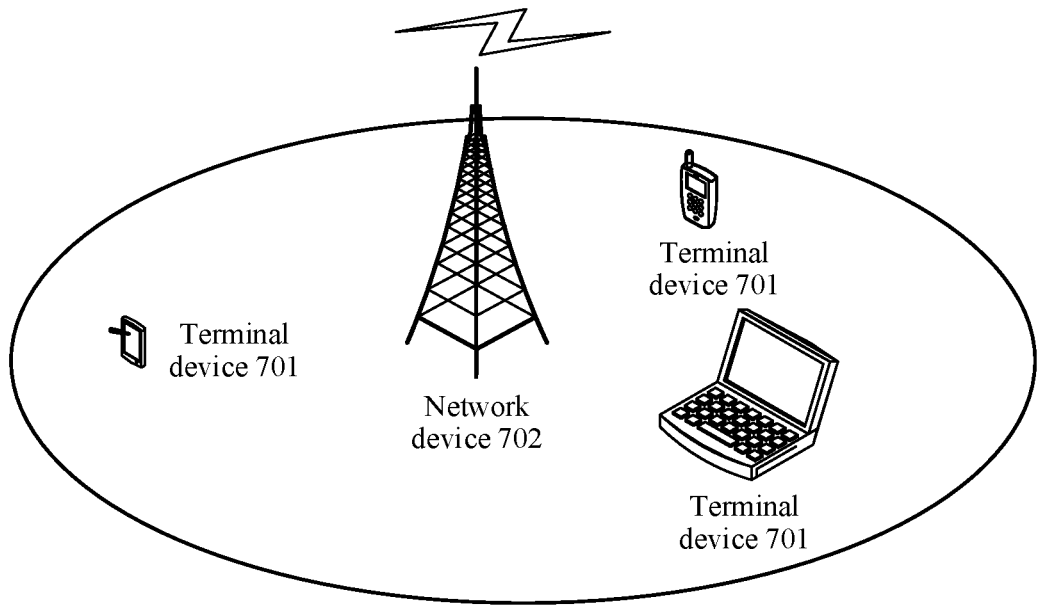
FIG. 7 is a simplified example diagram of a communications system according to an embodiment of this application.

FIG. 7 is a simplified example diagram of a communications system to which the embodiments of this application may be applied. Referring to FIG. 7, the communications system may include one or more terminal devices 701 and a network device 702. In actual application, a connection between each terminal device 701 and the network device 702 may be a wireless connection. The terminal device communicates with the network device by using a wireless communications technology.

The technical solutions provided in the embodiments of this application may be applied to wireless communication between communications devices. The wireless communication between communications devices may include wireless communication between a network device and a terminal device, wireless communication between network devices, and wireless communication between terminal devices. In the embodiments of this application, the term "wireless communication" may be referred to as "communication", and the term "communication" may also be described as "data transmission", "information transmission", or "transmission".

The terminal device 701 may be a wireless terminal device that can receive scheduling and indication information from a base station. The wireless terminal device may be a device that provides a user with voice and/or data connectivity, a handheld device with a radio connection function, or another processing device connected to a radio modem. The wireless terminal device may communicate with one or more core networks or the internet through a radio access network (RAN). The wireless terminal device may be a mobile terminal, for example, a mobile phone (also referred to as a "cellular" phone), a computer, and a data card, for example, may be a portable, pocket-sized, handheld, computer built-in, or vehicle-mounted mobile apparatus, which exchanges voice and/or data with the radio access network. For example, the wireless terminal device may be a personal communication service (PCS) phone, a cordless telephone, a session initiation protocol (SIP) phone, a wireless local loop (WLL) station, or a personal digital assistant (PDA). The wireless terminal device may also be referred to as a system, a subscriber unit, a subscriber station, a mobile station, a mobile console, a remote station, an access point (AP), a remote terminal device, an access terminal device, a user terminal device, a user agent, customer premises equipment (CPE), user equipment (UE), or the like. In an embodiment, the terminal device shown in FIG. 7 may be a mobile phone.

The network device 702 may be a base station (BS) or a base station controller used for wireless communication. The network device may also be referred to as a wireless access point, a transceiver station, a relay station, a cell, a transmission and reception point (TRP), or the like. The network device 702 may be an apparatus that is deployed in a radio access network and that is configured to provide a wireless communication function for the terminal device 701. Main functions of the network device 702 include one or more of the following functions: radio resource management, Internet protocol (IP) header compression and user data stream encryption, mobility management entity (MME) selection during attachment of user equipment, routing of user plane data to a serving gateway (SGW), paging message organization and sending, broadcast message organization and sending, measurement and measurement report configuration for the purpose of mobility or scheduling, and the like. The network device 702 may include various forms of cellular base stations, home base stations, cells, wireless transmission points, macro base stations, micro base stations, relay stations, wireless access points, and the like. In systems using different radio access technologies, devices with a network device function may have different names. For example, in a 5G system or NR, the device is referred to as a generation NodeB (gNB) or the like, and in a wireless local access system, the device is referred to as an access point.

It should be noted that in the 5G system, for an NR base station (NR-NB or gNB), one or more transmission and reception points (TRP) may exist, and the one or more TRPs belong to a same cell. In another scenario, the network device 702 may further include a central unit (CU) and a distributed unit (DU). A plurality of DUs may exist in a case of one CU. Each DU and the terminal device can use the method described in the embodiments of this application. A difference between the CU-DU separation scenario and the multi-TRP scenario lies in that, the TRP may be a radio frequency unit or an antenna device while the DU can implement a protocol stack function, for example, the DU can implement a physical layer function.

A name of the network device may vary with evolution of communications technologies. In addition, in another possible case, the network device 702 may be another apparatus providing a wireless communication function for the terminal device 701. For ease of description, in the embodiments of this application, the apparatus that provides the wireless communication function for the terminal device 701 is referred to as the network device 702.

For example, in the embodiments of this application, the terminal device shown in FIG. 7 may be a smartphone. The following describes each component of the smartphone in detail with reference to FIG. 8.

Figure 8:
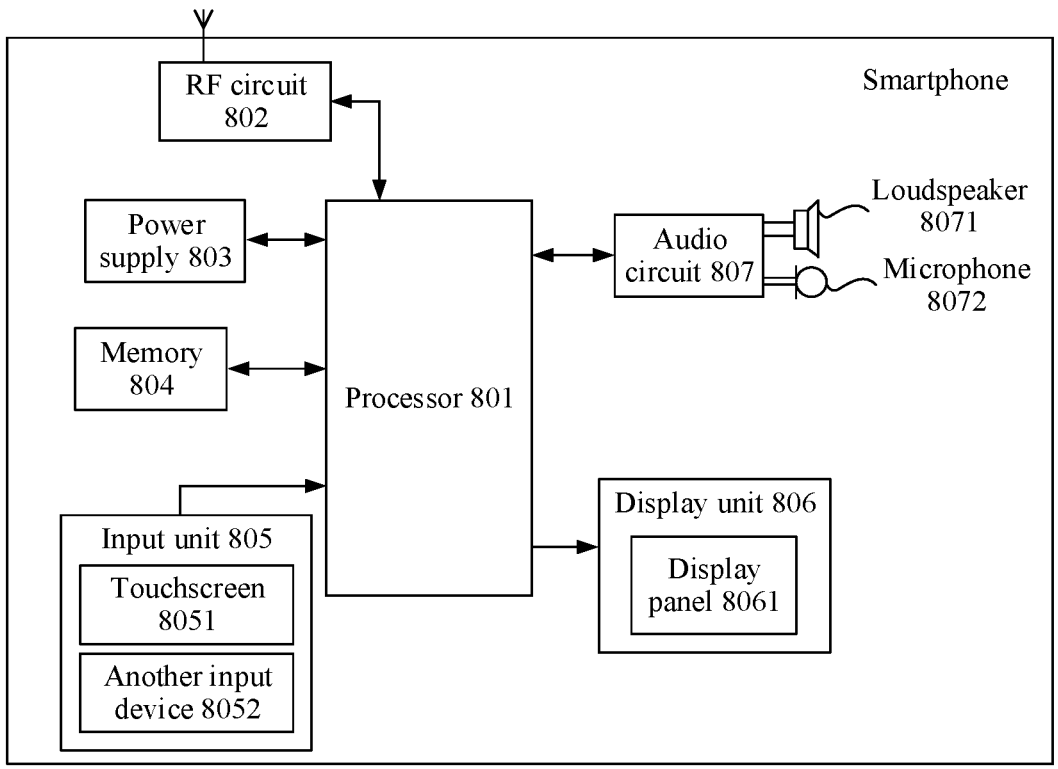
FIG. 8 is an example composition diagram of a smartphone according to an embodiment of this application.

As shown in FIG. 8, the smartphone includes components such as a processor 801, a radio frequency (RF) circuit 802, a power supply 803, a memory 804, an input unit 805, a display unit 806, and an audio circuit 807. A person skilled in the art may understand that a structure of the smartphone in FIG. 8 does not constitute a limitation on the smartphone, and may include more or fewer components than those shown in FIG. 8, or may combine some of the components shown in FIG. 8, or have components arranged differently from those shown in FIG. 8.

As a control center of the smartphone, the processor 801 connects all parts of the smartphone by using various interfaces and lines, and performs various functions and data processing of the smartphone by running or executing a software program and/or a module stored in the memory 804 and invoking data stored in the memory 804, to perform overall monitoring on the smartphone. In one embodiment, the processor 801 may include one or more processing units. Preferably, an application processor and a modem processor may be integrated into the processor 801. The application processor mainly processes an operating system, a user interface, an application program, and the like, and the modem processor mainly processes wireless communication. In one embodiment, the application processor and the modem processor may be disposed independently of each other, or may be integrated into a same device. In this embodiment of this application, the processor is configured to: determine a parameter determining rule based on a parameter type of a second-type BWP, and determine a parameter value of the second-type BWP according to the parameter determining rule; and determine a resource configuration of the second-type BWP, and determine a resource location of the second-type BWP based on the resource configuration of the second-type BWP.

The RF circuit 802 may be configured to receive and send signals in an information receiving and sending process or during a call. Particularly, after receiving downlink information from a base station, the RF circuit 802 sends the downlink information to the processor 801 for processing. In addition, the RF circuit 802 sends uplink data to the base station. The RF circuit usually includes but is not limited to an antenna, at least one amplifier, a transceiver, a coupler, a low noise amplifier (LNA), a duplexer, and the like. In addition, the RF circuit 802 may further communicate with a network and another device through wireless communication. The wireless communication may use any communication standard or protocol, including but not limited to global system for mobile communications (GSM), general packet radio service (GPRS), code division multiple access (CDMA), wideband code division multiple access (WCDMA), LTE, email, short message service (SMS), and the like.

The smartphone includes the power supply 803 (for example, a battery) for supplying power to the components. In one embodiment, the power supply may be logically connected to the processor 801 by using a power management system, to implement functions such as charging management, discharging management, and power consumption management by using the power management system.

The memory 804 may be configured to store a software program and a module, and the processor 801 performs various function applications and data processing of the smartphone by running the software program and the module stored in the memory 804. The memory 804 may mainly include a program storage area and a data storage area. The program storage area may store an operating system, an application program required by at least one function (for example, an email receiving function), and the like. The data storage area may store data (for example, audio data or an address book) created based on use of the smartphone, and the like. In addition, the memory 804 may include a high-speed random access memory, and may further include a nonvolatile memory such as at least one magnetic disk storage component, a flash memory component, or another volatile solid-state storage component.

The input unit 805 may be configured to: receive input digital or character information, and generate key signal input related to user setting and function control of the smartphone. In one embodiment, the input unit 805 may include a touchscreen 8051 and other input devices 8052. The touchscreen 8051, also referred to as a touch panel, may collect a touch operation performed by a user on or near the touchscreen 8051 (for example, an operation performed by the user on the touchscreen 8051 or near the touchscreen 8051 by using any appropriate object such as a finger or a stylus), and drive a corresponding connected apparatus according to a preset program. In one embodiment, the touchscreen 8051 may include two parts: a touch detection apparatus and a touch controller. The touch detection apparatus detects a touch orientation of the user, detects a signal generated by the touch operation, and transfers the signal to the touch controller. The touch controller receives the touch information from the touch detection apparatus, converts the touch information into touch point coordinates, and then sends the touch point coordinates to the processor 801. Moreover, the touch controller can receive and execute a command sent by the processor 801. In addition, the touchscreen 8051 may be implemented in a plurality of types, for example, a resistive type, a capacitive type, an infrared ray type, and a surface acoustic wave type.

The display unit 806 may be configured to display information entered by the user or information provided for the user, and various menus of the smartphone. The display unit 806 may include a display panel 8061. In one embodiment, the display panel 8061 may be configured in a form such as a liquid crystal display (LCD) or an organic light-emitting diode (OLED). Further, the touchscreen 8051 may cover the display panel 8061. After detecting a touch operation performed on or near the touchscreen 8051, the touchscreen 8051 sends the touch operation to the processor 801 to determine a type of a touch event, and then the processor 801 provides corresponding visual output on the display panel 8061 based on the type of the touch event. Although the touchscreen 8051 and the display panel 8061 in FIG. 8 are used as two independent components to implement input and output functions of the smartphone, in some embodiments, the touchscreen 8051 and the display panel 8061 may be integrated to implement the input and output functions of the smartphone.

The audio circuit 807, a loudspeaker 8071, and a microphone 8072 are configured to provide an audio interface between the user and the smartphone. The audio circuit 807 may convert received audio data into an electrical signal, and transmit the electrical signal to the loudspeaker 8071. The loudspeaker 8071 converts the electrical signal into a sound signal and outputs the sound signal. In addition, the microphone 8072 converts a collected sound signal into an electrical signal, and the audio circuit 807 receives the electrical signal, converts the electrical signal into audio data, and then outputs the audio data to the RF circuit 802, so that the RF circuit 802 sends the audio data to another smartphone, or transmits the audio data to the memory 804 for further processing.

In one embodiment, the smartphone may further include various sensors (for example, a gyroscope sensor, a hygrometer sensor, an infrared sensor, or a magnetometer sensor), a Wi-Fi module, a Bluetooth module, a housing, and the like. The sensors are not shown in FIG. 8.

For example, in the embodiments of this application, the network device 702 shown in FIG. 7 may be a base station. The following describes each component of the base station in detail with reference to FIG. 9.

Figure 9:
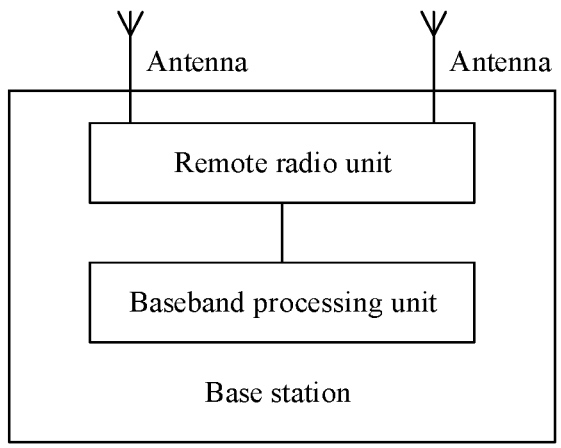
FIG. 9 is an example composition diagram of a base station according to an embodiment of this application.

As shown in FIG. 9, the base station includes a baseband unit (BBU), a radio remote unit (RRU), and an antenna. The RRU and the BBU may be connected by using an optical fiber. The RRU is further connected to the antenna by using a coaxial cable and a power splitter (coupler). Generally, one BBU may be connected to a plurality of RRUs.

The RRU may include four modules: a digital intermediate frequency module, a transceiver module, a power amplification module, and a filtering module. The digital intermediate frequency module is used for modulation and demodulation in optical transmission, digital up- and down-frequency conversion, digital-to-analog conversion, and the like. The transceiver module completes conversion from an intermediate frequency signal to a radio frequency signal; and then the radio frequency signal is amplified by the power amplification module, filtered by the filtering module, and transmitted by using the antenna.

The BBU is configured to implement a baseband processing function (encoding, multiplexing, modulation, spreading, and the like) of a Uu interface (in one embodiment, an interface between a terminal device and the base station); an interface function, signaling processing, and local and remote operation and maintenance functions of a logical interface between a radio network controller (RNC) and the base station; an operating status monitoring function and an alarm information reporting function of a base station system; and the like.

With reference to the accompanying drawings, the following describes in detail a method for configuring a parameter of a bandwidth part by a terminal device and a network device. Certainly, the parameter configuration method may be alternatively performed by a chip built in the terminal device or a chip built in the network device. This is not limited in the embodiments of this application.

Figure 10:
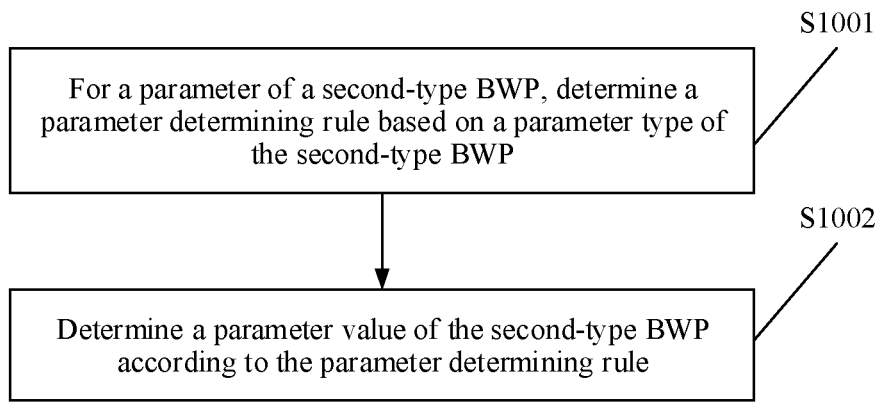
FIG. 10 is a flowchart of a parameter configuration method according to an embodiment of this application.

FIG. 10 is a flowchart of a parameter configuration method according to an embodiment of this application. As shown in FIG. 10, the method may include the following operations.

S1001: For a parameter of a second-type BWP, determine a parameter determining rule based on a parameter type of the second-type BWP.

In this embodiment of this application, the parameter of the second-type BWP may include a BWP common parameter or a BWP dedicated parameter. The BWP common parameter is a parameter sent by using common information, or may be a parameter configured for one group of terminal devices. One group of terminal devices may include one or more devices. For example, one group of terminal devices may be all terminal devices in a cell or some terminal devices in a cell. The BWP common parameter may be indicated by a network device to a terminal device by using higher layer signaling. The higher layer signaling may be radio resource control (RRC) signaling or media access control (MAC) signaling. For example, the BWP common parameter is indicated to the terminal device by using a BWP common field in the RRC signaling. The BWP common parameter may be broadcast to each terminal device by using a system message. BWP common parameters received by all the terminal devices are the same. For example, a common parameter configured for a physical downlink control channel (PDCCH), a physical downlink shared channel (PDSCH), a physical uplink control channel (PUCCH), or a physical uplink shared channel (PUSCH) may be a BWP common parameter. The BWP dedicated parameter is a parameter sent by the network device to the terminal device by using dedicated information or signaling of a terminal device level. Parameter values of different terminal devices are independently configured, and parameter values of different terminal devices may be the same or may be different. This is not limited in this application. The BWP dedicated parameter may be a parameter that can be configured for each BWP. Dedicated parameters of different BWPs may be different or may be the same. This is not limited in this embodiment of this application. The BWP dedicated parameter may be indicated by the network device to the terminal device by using higher layer signaling. The higher layer signaling may be RRC signaling or MAC signaling. For example, the BWP dedicated parameter is indicated to the terminal device by using a BWP dedicated field in the RRC signaling. The dedicated parameter may be indicated to the terminal device by using RRC signaling, and dedicated parameters received by all terminal devices may be the same or different. For example, a dedicated parameter configured for a PDCCH or a PDSCH may be a BWP dedicated parameter.

In the embodiments of this application, the parameter type of the second-type BWP is used to distinguish between two different parameters. It may be understood that parameters of two second-type BWPs with different functions may be considered as two different parameter types. In the embodiments of this application, parameter determining rules corresponding to different parameter types of second-type BWPs may be different or may be the same.

S1002: Determine a parameter value of the second-type BWP according to the parameter determining rule.

For the parameter of the second-type BWP, after the parameter determining rule is determined based on the parameter type of the second-type BWP, the parameter value of the parameter of the second-type BWP may be determined according to the parameter determining rule. In the embodiments of this application, the parameter determining rule may also be referred to as a rule, a parameter rule, or another name, and this is not limited in this application.

In the embodiments of this application, the parameter value of the second-type BWP may be one parameter value, or may be candidate values of the parameter value, where the candidate values may include a plurality of parameter values. Alternatively, the candidate values of the parameter value may be represented as a parameter value list.

In a first implementable manner, the second-type BWP includes N frequency domain resources, and the N frequency domain resources may be N first-type BWPs. Therefore, a BWP common parameter and a BWP dedicated parameter may be configured for each of the N frequency domain resources. The parameter determining rule may be a first rule. In one embodiment, the parameter value of the second-type BWP is determined based on parameter values of M frequency domain resources. The M frequency domain resources are M frequency domain resources included in the N frequency domain resources, where M is an integer greater than or equal to 1 and less than or equal to N; the M frequency domain resources are (M−1) frequency domain resources included in the N frequency domain resources and a primary frequency domain resource; the M frequency domain resources are (M−1) frequency domain resources included in the N frequency domain resources and a default frequency domain resource; or the M frequency domain resources are (M−1) frequency domain resources included in the N frequency domain resources and a frequency domain resource used for initial access, where M is an integer greater than or equal to 1.

It may be understood that when M=N, the parameter value of the second-type BWP is determined based on parameter values of the N frequency domain resources included in the second-type BWP. For example, one second-type BWP includes a total of two frequency domain resources: a first frequency domain resource and a second frequency domain resource. In this case, a parameter value of the second-type BWP may be determined based on a parameter value of the first frequency domain resource and/or a parameter value of the second frequency domain resource.

It may be understood that when M<N, the parameter value of the second-type BWP is determined based on parameter values of some of the N frequency domain resources included in the second-type BWP. For example, one second-type BWP includes a total of three frequency domain resources: a first frequency domain resource, a second frequency domain resource, and a third frequency domain resource. In this case, a parameter value of the second-type BWP may be determined based on a parameter value of the first frequency domain resource and a parameter value of the second frequency domain resource; a parameter value of the second-type BWP may be determined based on a parameter value of the first frequency domain resource and a parameter value of the third frequency domain resource; or a parameter value of the second-type BWP may be determined based on a parameter value of the second frequency domain resource and a parameter value of the third frequency domain resource.

It should be noted that parameter values of which frequency domain resources in the N frequency domain resources included in the second-type BWP are used to determine the parameter value of the second-type BWP may be preconfigured, or may be determined according to a preset rule, or may be notified by the base station to the terminal device.

Therefore, the parameter value of the second-type BWP may be determined based on at least two frequency domain resource parameter values.

In one embodiment, when frequency domain resources, in the N frequency domain resources included in the second-type BWP, whose parameter values are used to determine the parameter value of the second-type BWP are determined according to a preset rule, the preset rule may be determining a value of M and determining which frequency domain resources are the M frequency domain resources.

In one embodiment, any one of the determined M frequency domain resources may be a frequency domain resource included in the second-type BWP, or may be a frequency domain resource not included in the second-type BWP, for example, may be a frequency domain resource used for initial access, a primary frequency domain resource, or a default frequency domain resource.

The value of M may be determined based on at least one of the following methods:

(1) The value of M may be predefined. For example, it is specified that the value of M is a quantity of frequency domain resources included in the second-type BWP or a sum of a quantity of frequency domain resources included in the second-type BWP and 1 (for example, if the second-type BWP does not include a frequency domain resource used for initial access, a primary frequency domain resource, or a default frequency domain resource, the value of M may be determined based on a parameter of an included frequency domain resource, or may be determined based on a parameter of a frequency domain resource not included).

(2) The value of M is a predefined quantity. For example, a protocol predefines that there are M frequency domain resources, where M may be a positive integer.

(3) The value of M is determined based on an indication of the base station. For example, the base station may indicate that there are M frequency domain resources, where M may be a positive integer.

Which frequency domain resources are the M frequency domain resources may be determined based on the following methods:

(1) An identifier of a frequency domain resource is determined, and the M frequency domain resources are determined based on frequency domain resources included in the second-type BWP. For example, if the second-type BWP includes N frequency domain resources, the parameter of the second-type BWP is determined based on parameters of the N frequency domain resources.

(2) If the determined value of M is different from a quantity of frequency domain resources included in the second-type BWP, the M frequency domain resources may be determined in the following manner:

A frequency domain resource is determined based on a value of a frequency domain resource identifier. For example, frequency domain resources included in the second-type BWP is a frequency domain resource X1, a frequency domain resource X2, and a frequency domain resource X3. If the determined value of M is less than 3, the frequency domain resources may be determined based on a value of a frequency domain resource identifier. For example, a small frequency domain resource identifier prevails. If X1<X2<X3, the parameter value of the second-type BWP is determined based on a parameter value of the frequency domain resource X1 and a parameter value of the frequency domain resource X2. For example, a large frequency domain resource identifier prevails. If X1<X2<X3, the parameter value of the second-type BWP is determined based on a parameter value of the frequency domain resource X2 and a parameter value of the frequency domain resource X3.

(3) The M frequency domain resources are determined based on an indication of the base station. For example, the base station may indicate that there are M frequency domain resources, where M may be a positive integer.

When frequency domain resources whose parameter values are related to the parameter value of the second-type BWP are determined, the parameter value may be determined according to the method in this application.

It should be noted that, for the terminal device, the terminal device may preconfigure parameter values of the N frequency domain resources and identifiers corresponding to the N frequency domain resources. Before determining the parameter value of the second-type BWP based on the parameter values of the M frequency domain resources, the terminal device may receive M frequency domain resource identifiers sent by the network device, and obtain the parameter values of the M frequency domain resources based on the M frequency domain resource identifiers, where frequency domain resources corresponding to the M frequency domain resource identifiers are frequency domain resources in the N frequency domain resources preconfigured by the terminal device. Alternatively, the terminal device may receive the parameter values that are of the M frequency domain resources and that are sent by the network device.

In addition to determining the parameter value of the second-type BWP based on parameter values of frequency domain resources included in the second-type BWP, the parameter value of the second-type BWP may be determined only based on a parameter value of a frequency domain resource not included in the second-type BWP. For example, the terminal device may determine the parameter value of the second-type BWP based on a parameter value of a frequency domain resource used for initial access, a parameter value of a primary frequency domain resource, or a parameter value of a default frequency domain resource. In this scenario, the parameter value of the frequency domain resource used for initial access, the parameter value of the primary frequency domain resource, or the parameter value of the default frequency domain resource used for determining the parameter value of the second-type BWP is not included in the second-type BWP.

In a second implementable manner, the parameter determining rule may be a second rule. In one embodiment, the terminal device determines the parameter value of the second-type BWP based on an attribute of a frequency domain resource.

In the embodiments of this application, the attribute of the frequency domain resource may indicate whether the frequency domain resource is a frequency domain resource used for initial access, or whether the frequency domain resource is a primary frequency domain resource, or whether the frequency domain resource is a default frequency domain resource.

For example, the terminal device determines the parameter value of the second-type BWP based on a parameter value of a frequency domain resource used for initial access, or determines the parameter value of the second-type BWP based on a parameter value corresponding to a primary frequency domain resource or a preconfigured frequency domain resource. The frequency domain resource used for initial access may be a frequency domain resource used by the terminal device to perform synchronization and/or access, or receive a synchronization signal, or transmit a system information block (SIB) 1. For example, a BWP whose BWP identifier is 0 may be a frequency domain resource used for initial access.

In the embodiments of this application, the primary frequency domain resource may be a frequency domain resource used to transmit a PDCCH, or the primary frequency domain resource may be a frequency domain resource including common search space of a PDCCH. The SIB 1 is used to transmit system information, and the terminal device may obtain, based on the SIB 1, a parameter or information related to cell access.

It should be noted that when the parameter value of the second-type BWP is determined based on the parameter value of the frequency domain resource used for initial access, the parameter value of the primary frequency domain resource, or the parameter value of the default frequency domain resource, the frequency domain resource used for initial access, the primary frequency domain resource, or the default frequency domain resource may be a frequency domain resource that does not belong to the second-type BWP, or may be a frequency domain resource that belongs to the second-type BWP. This is not limited in this application. It is assumed that the second-type BWP includes a total of two frequency domain resources: a first frequency domain resource and a second frequency domain resource. For example, if the first frequency domain resource is a frequency domain resource used for initial access, a parameter value of the first frequency domain resource is determined as the parameter value of the second-type BWP. If the second frequency domain resource is a frequency domain resource used for initial access, a parameter value of the second frequency domain resource is determined as the parameter value of the second-type BWP.

In one embodiment, the parameter value of the second-type BWP may be determined based on both a parameter value of a frequency domain resource not included in the second-type BWP and a parameter value of a frequency domain resource included in the second-type BWP.

According to the parameter configuration method provided in the embodiments of this application, the network device or the terminal device can determine the parameter of the second-type BWP in a case of a discrete spectrum, and receive or send data on a frequency domain location of the second-type BWP based on the parameter value of the second-type BWP, so that utilization of the discrete spectrum is effectively improved and system performance is improved.

For the first implementable manner, the parameter value of the second-type BWP may be determined based on the parameter values of the M frequency domain resources in the following embodiments.

Figure 11:
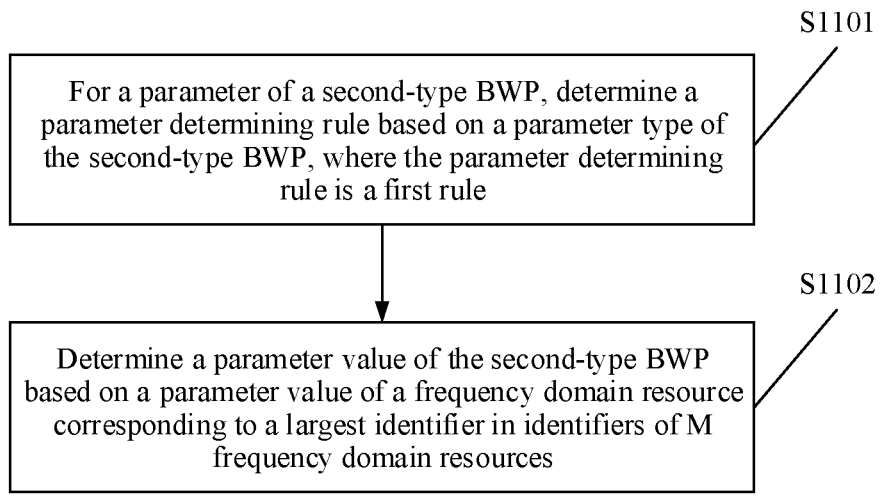
FIG. 11 is a flowchart of another parameter configuration method according to an embodiment of this application.

Method 1: The parameter value of the second-type BWP may be determined from M parameter values of the M frequency domain resources based on identifiers of the M frequency domain resources. FIG. 11 is a flowchart of a parameter configuration method according to an embodiment of this application. As shown in FIG. 11, the method may include the following operations:

S1101: For a parameter of a second-type BWP, determine a parameter determining rule based on a parameter type of the second-type BWP, where the parameter determining rule is a first rule.

S1102: Determine a parameter value of the second-type BWP based on a parameter value of a frequency domain resource corresponding to a largest identifier in identifiers of M frequency domain resources.

In this embodiment of this application, the identifier of the frequency domain resource may also be referred to as an index of the frequency domain resource.

For example, one second-type BWP includes two frequency domain resources, an identifier of a first frequency domain resource is 0, and an identifier of a second frequency domain resource is 1. The identifier of the first frequency domain resource is compared with the identifier of the second frequency domain resource. Because the identifier of the second frequency domain resource is greater than the identifier of the first frequency domain resource, a parameter value of the second frequency domain resource is determined as the parameter value of the second-type BWP. In other words, when sending or receiving data by using a frequency domain resource in the second-type BWP, a terminal device or a network device uses the parameter value of the second frequency domain resource included in the second-type BWP.

In one embodiment, the parameter or the parameter type of the second-type BWP may include a data scrambling identifier. In this embodiment of this application, the data scrambling identifier may be used to determine an initial value of a data scrambling sequence based on the data scrambling identifier, to generate the data scrambling sequence. For example, one second-type BWP includes two frequency domain resources, a data scrambling identifier configured for a first frequency domain resource is D1, and a data scrambling identifier configured for a second frequency domain resource is D2. When the terminal device or the network device sends or receives data by using a frequency domain resource in the second-type BWP, and uses a parameter value of the second frequency domain resource included in the second-type BWP, the terminal device or the network device may use the data scrambling identifier, namely, D2, configured for the second frequency domain resource. For a value of the data scrambling identifier, refer to descriptions in the prior art or evolution thereof. This is not limited in this embodiment of this application.

In one embodiment, the parameter or the parameter type of the second-type BWP may include a resource block group (RBG) size. The RBG size refers to a quantity of RBs included in an RBG, for example, a positive integer such as 2, 4, or 8. The RBG size may be related to downlink system bandwidth, BWP bandwidth, or the like, and may also be configured by the network device for the terminal device. In resource allocation time-frequency domain, RB may be used as a unit, or RBG may be used as a unit. The configuration information RBG size (for example, rbg-size) may be used to indicate a size of an RBG used by the terminal device or the network device in a case of a resource allocation type 0. For example, a size of a configuration 1 or a size of a configuration 2 may be used. For example, as shown in Table 2, in a case of different BWP bandwidth, an RBG size corresponding to the configuration 1 or the configuration 2 may be used.

TABLE 2

| BWP size/bandwidth | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

For example, one second-type BWP includes two frequency domain resources, an RBG size configured for a first frequency domain resource corresponds to the configuration 1, and an RBG size configured for a second frequency domain resource corresponds to the configuration 2. When the terminal device or the network device sends or receives data by using a frequency domain resource in the second-type BWP, and uses a parameter value of the second frequency domain resource included in the second-type BWP, the terminal device or the network device may use the RBG size configured for the second frequency domain resource, that is, an RBG size determined based on bandwidth of the second frequency domain resource and the configuration 2. For a configuration of the RBG size, refer to descriptions in the prior art or evolution thereof. This is not limited in this embodiment of this application.

Figure 12:
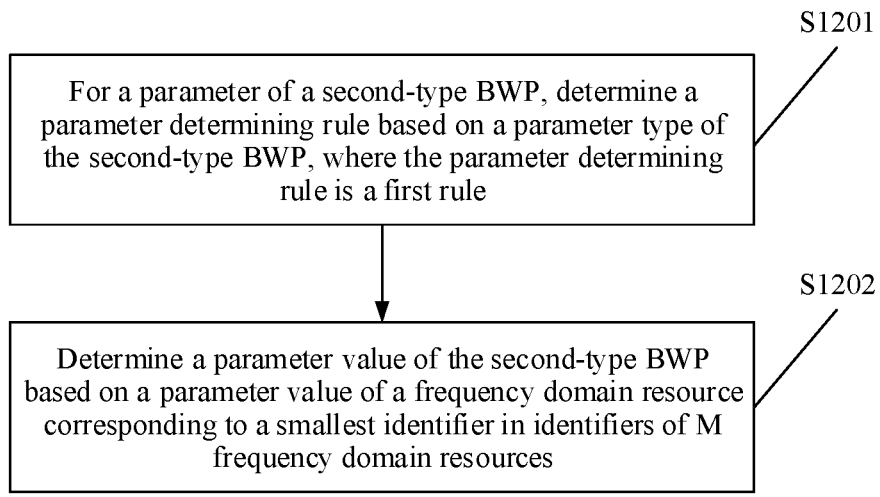
FIG. 12 is a flowchart of still another parameter configuration method according to an embodiment of this application.

FIG. 12 is a flowchart of a parameter configuration method according to an embodiment of this application. As shown in FIG. 12, the method may include the following operations:

S1201: For a parameter of a second-type BWP, determine a parameter determining rule based on a parameter type of the second-type BWP, where the parameter determining rule is a first rule.

S1202: Determine a parameter value of the second-type BWP based on a parameter value of a frequency domain resource corresponding to a smallest identifier in identifiers of M frequency domain resources.

For example, one second-type BWP includes two frequency domain resources, an identifier of a first frequency domain resource is 0, and an identifier of a second frequency domain resource is 1. The identifier of the first frequency domain resource is compared with the identifier of the second frequency domain resource. Because the identifier of the first frequency domain resource is less than the identifier of the second frequency domain resource, a parameter value of the first frequency domain resource is determined as the parameter value of the second-type BWP. In other words, when sending or receiving data by using a frequency domain resource in the second-type BWP, a terminal device or a network device uses the parameter value of the first frequency domain resource included in the second-type BWP.

In one embodiment, the parameter or the parameter type of the second-type BWP is a resource block group (RBG) size. For example, one second-type BWP includes two frequency domain resources, an RBG size configured for a first frequency domain resource corresponds to the configuration 1 in Table 2, and an RBG size configured for a second frequency domain resource corresponds to the configuration 2 in Table 2. When the terminal device or the network device sends or receives data by using a frequency domain resource in the second-type BWP, and uses a parameter value of the first frequency domain resource included in the second-type BWP, the terminal device or the network device may use the RBG size configured for the first frequency domain resource, that is, an RBG size determined based on bandwidth of the first frequency domain resource and the configuration 1.

In one embodiment, the parameter or the parameter type of the second-type BWP is a data scrambling identifier. For example, one second-type BWP includes two frequency domain resources, a data scrambling identifier configured for a first frequency domain resource is D1, and a data scrambling identifier configured for a second frequency domain resource is D2. When the terminal device or the network device sends or receives data by using a frequency domain resource in the second-type BWP, and uses a parameter value of the first frequency domain resource included in the second-type BWP, the terminal device or the network device may use the data scrambling identifier, namely, D1, configured for the first frequency domain resource.

Figure 13:
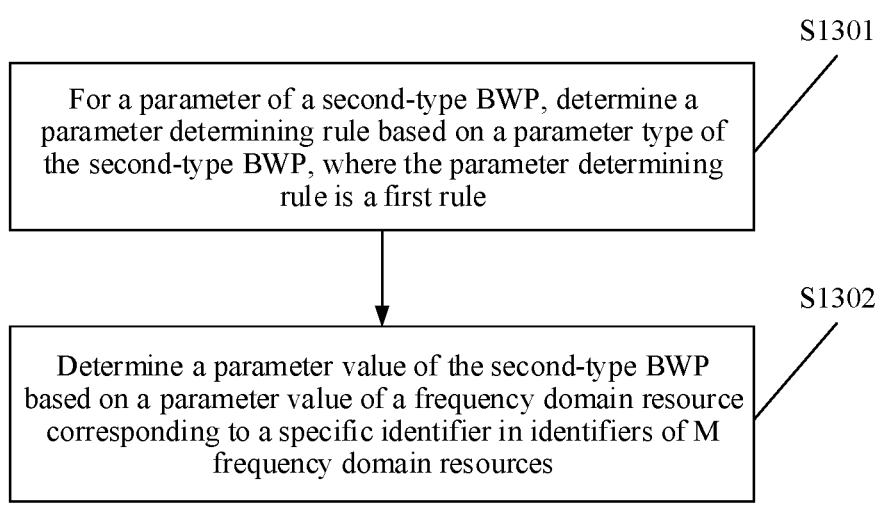
FIG. 13 is a flowchart of yet another parameter configuration method according to an embodiment of this application.

FIG. 13 is a flowchart of a parameter configuration method according to an embodiment of this application. As shown in FIG. 13, the method may include the following operations:

S1301: For a parameter of a second-type BWP, determine a parameter determining rule based on a parameter type of the second-type BWP, where the parameter determining rule is a first rule.

S1302: Determine a parameter value of the second-type BWP based on a parameter value of a frequency domain resource corresponding to an identifier in identifiers of M frequency domain resources.

The identifier may be an identifier preconfigured for a terminal device and a network device, for example, may be preset in a protocol. For example, a parameter value of a frequency domain resource corresponding to a first identifier in the identifiers of the M frequency domain resources is determined as the parameter value of the second-type BWP. For example, one second-type BWP includes three frequency domain resources, an identifier of a first frequency domain resource is 0, an identifier of a second frequency domain resource is 1, and an identifier of a third frequency domain resource is 2. A parameter value of a frequency domain resource corresponding to a first identifier in the identifiers of the three frequency domain resources is determined as the parameter value of the second-type BWP. For example, the parameter of the second-type BWP is a data scrambling identifier. When sending or receiving data by using a frequency domain resource in the second-type BWP described in this paragraph, the terminal device or the network device uses a data scrambling identifier configured for the first frequency domain resource included in the second-type BWP.

Alternatively, for the terminal device, the identifier may be an identifier received from the network device. In one embodiment, the network device may send indication information to indicate the identifier. The terminal device determines the identifier based on the indication information, and further determines the parameter value of the second-type BWP based on a parameter value of a frequency domain resource corresponding to the identifier. The indication information may be sent by using higher layer signaling, or may be sent by using physical layer information.

Alternatively, for the terminal device, the identifier may be an identifier of a frequency domain resource used for initial access.

Figure 14:
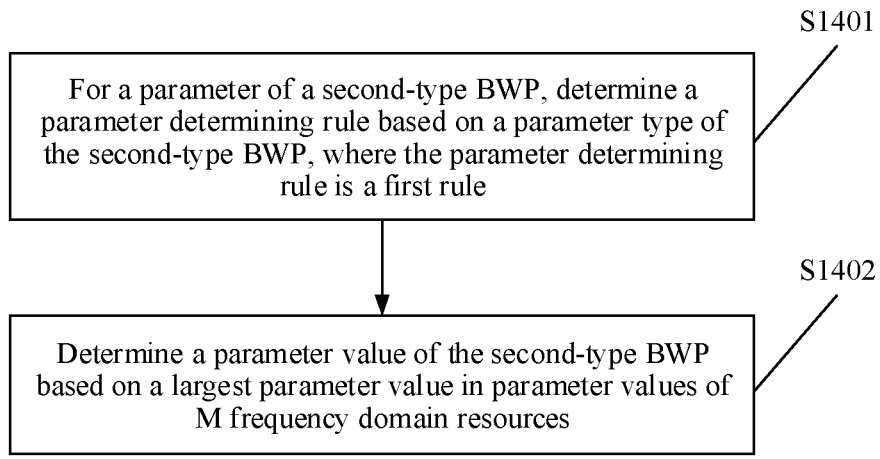
FIG. 14 is a flowchart of yet another parameter configuration method according to an embodiment of this application.

Method 2: The parameter value of the second-type BWP may be determined from M parameter values of the M frequency domain resources based on parameter values of the M frequency domain resources. FIG. 14 is a flowchart of a parameter configuration method according to an embodiment of this application. As shown in FIG. 14, the method may include the following operations:

S1401: For a parameter of a second-type BWP, determine a parameter determining rule based on a parameter type of the second-type BWP, where the parameter determining rule is a first rule.

S1402: Determine a parameter value of the second-type BWP based on a largest parameter value in parameter values of M frequency domain resources.

For example, the parameter or the parameter type of the second-type BWP is a PDSCH aggregation factor. In this embodiment of this application, the PDSCH aggregation factor is used to indicate a quantity of slots for continuously transmitting a PDSCH in one time of scheduling. For example, if a value of the aggregation factor is 2, it indicates that the PDSCH may be transmitted in two slots.

It is assumed that one second-type BWP includes a total of two frequency domain resources: a first frequency domain resource and a second frequency domain resource. An aggregation factor configured for the first frequency domain resource is f1, and an aggregation factor configured for the second frequency domain resource is f2. For a value of the aggregation factor, refer to descriptions in the prior art or evolution thereof. This is not limited in this embodiment of this application. If the aggregation factor f1 configured for the first frequency domain resource is greater than the aggregation factor f2 configured for the second frequency domain resource, a terminal device or a network device may use the aggregation factor configured for the first frequency domain resource, in other words, f1 may be used to transmit a PDSCH in the second-type BWP.

Figure 15:
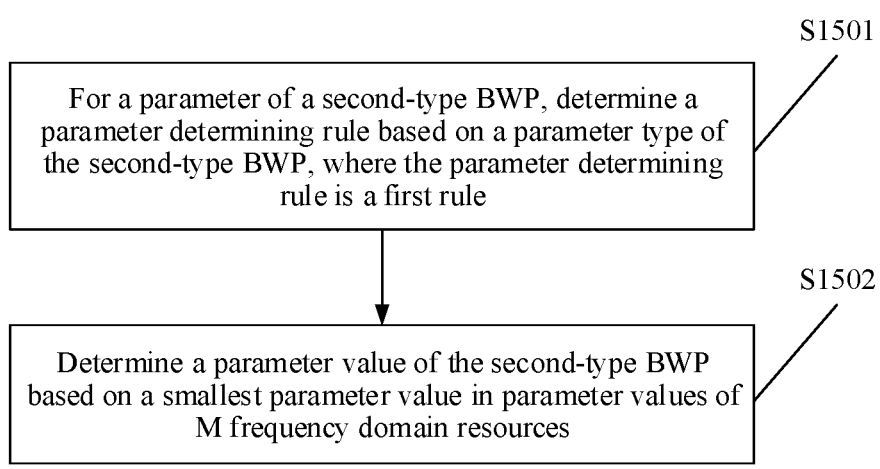
FIG. 15 is a flowchart of yet another parameter configuration method according to an embodiment of this application.

FIG. 15 is a flowchart of a parameter configuration method according to an embodiment of this application. As shown in FIG. 15, the method may include the following operations:

S1501: For a parameter of a second-type BWP, determine a parameter determining rule based on a parameter type of the second-type BWP, where the parameter determining rule is a first rule.

S1502: Determine a parameter value of the second-type BWP based on a smallest parameter value in parameter values of M frequency domain resources.

For example, the parameter or the parameter type of the second-type BWP is a PDSCH aggregation factor.

It is assumed that one second-type BWP includes a total of two frequency domain resources: a first frequency domain resource and a second frequency domain resource. An aggregation factor configured for the first frequency domain resource is f1, and an aggregation factor configured for the second frequency domain resource is f2. If the aggregation factor f1 configured for the first frequency domain resource is greater than the aggregation factor f2 configured for the second frequency domain resource, a terminal device or a network device may use the aggregation factor configured for the second frequency domain resource, in other words, f2 may be used to transmit a PDSCH in the second-type BWP.

Figure 16:
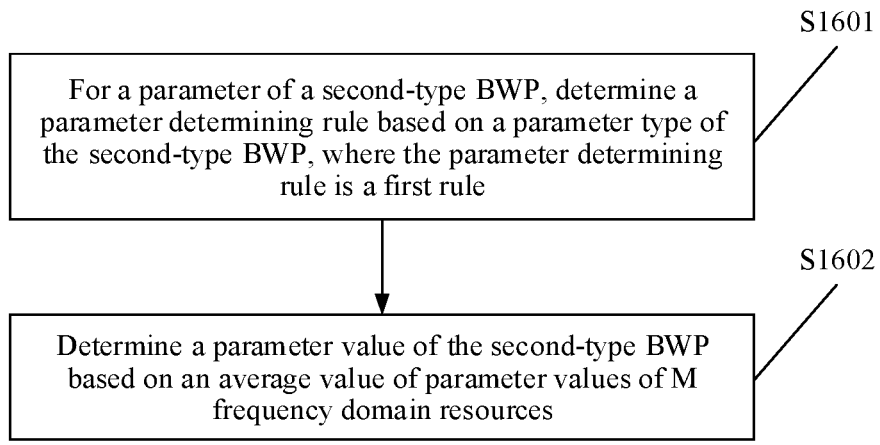
FIG. 16 is a flowchart of yet another parameter configuration method according to an embodiment of this application.

FIG. 16 is a flowchart of a parameter configuration method according to an embodiment of this application. As shown in FIG. 16, the method may include the following operations:

S1601: For a parameter of a second-type BWP, determine a parameter determining rule based on a parameter type of the second-type BWP, where the parameter determining rule is a first rule.

S1602: Determine a parameter value of the second-type BWP based on an average value of parameter values of M frequency domain resources.

For example, the parameter or the parameter type of the second-type BWP is a PDSCH aggregation factor.

It is assumed that one second-type BWP includes a total of two frequency domain resources: a first frequency domain resource and a second frequency domain resource. An aggregation factor configured for the first frequency domain resource is f1, and an aggregation factor configured for the second frequency domain resource is f2. A terminal device or a network device may use an average value of the aggregation factor configured for the first frequency domain resource and the aggregation factor configured for the second frequency domain resource as an aggregation factor of the second-type BWP, in other words, (f1+f2)/2 may be used to transmit a PDSCH in the second-type BWP.

In one embodiment, a product of the average value of the parameter values of the M frequency domain resources and a scale factor may be used as the aggregation factor of the second-type BWP, or a candidate value whose difference from the average value of the parameter values of the M frequency domain resources is the smallest in candidate values may be used as the aggregation factor of the second-type BWP, or a parameter value obtained by rounding up or rounding down the average value of the parameter values of the M frequency domain resources may be used as the aggregation factor of the second-type BWP. For example, when candidate values of the aggregation factor of the second-type BWP are 1, 2, 4, and 8, for the second-type BWP, a value whose difference from the average value of f1 and f2 is the smallest in 1, 2, 4, and 8 may be used as the aggregation factor of the second-type BWP, or a value whose absolute value of a difference from the average value of f1 and f2 is the smallest in 1, 2, 4, and 8 may be used as the aggregation factor of the second-type BWP. For example, it is assumed that f1=2, f2=8, (f1+f2)/2=5, and a difference between 5 and 4 is the smallest or an absolute value of a difference between 5 and 4 is the smallest. Therefore, the aggregation factor of the second-type BWP is 4, and 4 is used to transmit a PDSCH in the second-type BWP.

Figure 17:
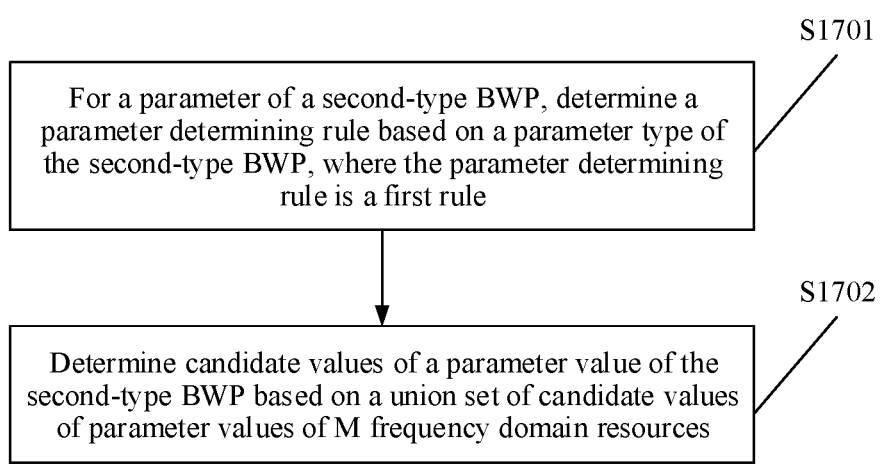
FIG. 17 is a flowchart of yet another parameter configuration method according to an embodiment of this application.

Method 3: The candidate values of the parameter value of the second-type BWP may be determined based on candidate values of parameter values of the M frequency domain resource. FIG. 17 is a flowchart of a parameter configuration method according to an embodiment of this application. As shown in FIG. 17, the method may include the following operations:

S1701: For a parameter of a second-type BWP, determine a parameter determining rule based on a parameter type of the second-type BWP, where the parameter determining rule is a first rule.

S1702: Determine candidate values of a parameter value of the second-type BWP based on a union set of candidate values of parameter values of M frequency domain resources.

For example, the parameter or the parameter type of the second-type BWP is a PDSCH time domain resource allocation. In this embodiment of this application, a time domain resource allocation list (PDSCH-time domain allocation list) is used to indicate a PDSCH candidate time domain resource allocation set. For example, a network device may configure one or more candidate time domain resource allocations for a terminal device by using higher layer signaling, and may indicate, in DCI, one of the candidate time domain resource allocations as a PDSCH time domain resource allocation configured by the network device for the terminal device.

It is assumed that one second-type BWP includes a total of two frequency domain resources: a first frequency domain resource and a second frequency domain resource, a time domain resource allocation list configured for the first frequency domain resource includes rows x1 to x16, and a time domain resource allocation list configured for the second frequency domain resource includes rows y1 to y16. For a quantity of rows included in the time domain resource allocation list, refer to descriptions in the prior art or evolution thereof. This is not limited in this embodiment of this application. In this embodiment of this application, one row of the time domain resource allocation list may correspond to one time domain resource allocation. Certainly, the time-domain resource list may alternatively exist in a form of columns. For example, one column of the time-domain resource allocation list may correspond to one time domain resource allocation. It is assumed that rows x1 to x8 included in the time domain resource allocation list configured for the first frequency domain resource are the same as y1 to y8 included in the time domain resource allocation list configured for the second frequency domain resource. In this case, candidate values in a time domain resource allocation list of the second-type BWP may include the rows x1 to x8 or the rows y1 to y8, x9 to x16, and y9 to y16.

It should be noted that if a quantity of candidate rows exceeds a quantity of rows that can be included in a time domain resource allocation list, a quantity of rows included in the time domain resource allocation list of the second-type BWP may be determined based on the following method. First, half of candidate values of a parameter value of each frequency domain resource are selected. For example, if a maximum quantity of rows required is 16, the time domain resource allocation list of the second-type BWP may include the rows x1 to x8 included in the time domain resource allocation list configured for the first frequency domain resource and y1 to y8 included in the time domain resource allocation list configured for the second frequency domain resource. Second, in addition to the rows with repeated values, half of remaining rows included in a time domain resource allocation list configured for each frequency domain resource are selected. For example, the time domain resource allocation list of the second-type BWP may include x1 to x8 or y1 to y8, x9 to x12, and y9 to y12.

In this embodiment of this application, when the candidate values of the parameter value of the second-type BWP are obtained by combining candidate values of parameter values of at least two frequency domain resources, sorting of the candidate values obtained through combination needs to be determined, or in other words, the plurality of candidate values may be identified. When the network device indicates the parameter value of the second-type BWP to the terminal device by using DCI, an identifier of at least one of the plurality of candidate values may be indicated, and the terminal device determines, based on the identifier of the at least one candidate value, a parameter value configured by the network device for the terminal device.

In one embodiment, the sorting of the candidate values of the parameter value of the second-type BWP may be determined based on identifiers of the M frequency domain resources, or may be determined based on attributes of the M frequency domain resources.

In one embodiment, a candidate value corresponding to a small identifier ranks before a candidate value corresponding to a large identifier, or a candidate value corresponding to a small identifier ranks after a candidate value corresponding to a small identifier, or there is another sorting method. This is not limited in this application. For example, one second-type BWP includes a total of two frequency domain resources: a first frequency domain resource and a second frequency domain resource. An identifier of the first frequency domain resource is X1, and an identifier of the second frequency domain resource is X2. If X1<X2, based on the method in which a candidate value corresponding to a small identifier ranks before a candidate value corresponding to a large identifier, the sorting of the candidate values of the parameter value of the second-type BWP is that candidate values of a parameter value corresponding to the frequency domain resource X1 rank before candidate values of a parameter value corresponding to the frequency domain resource X2. For example, as shown in Table 3, the third column in Table 3 is optional.

TABLE 3

| Parameter identifier or index of the second-type BWP | Candidate values of the parameter value | Description |
| --- | --- | --- |
| 1 to 8 | x1 to x8 or y1 to y8 | Repeated candidate values of the frequency domain resource X1 and the frequency domain resource X2 |
| 9 to 12 | x9 to x12 | Candidate values corresponding to the frequency domain resource X1 |
| 13 to 16 | y9 to y12 | Candidate values corresponding to the frequency domain resource X2 |

In one embodiment, the repeated candidate values in Table 3 may rank before the candidate values of the frequency domain resource X1, or may rank after the candidate values of the frequency domain resource X1, or may rank before the candidate values of the frequency domain resource X2, or may rank after the candidate values of the frequency domain resource X2, and this is not specifically limited.

In one embodiment, a sorting rule of the candidate values of the parameter value of the second-type BWP may be predefined, or may be notified by the base station to the UE.

Figure 18:
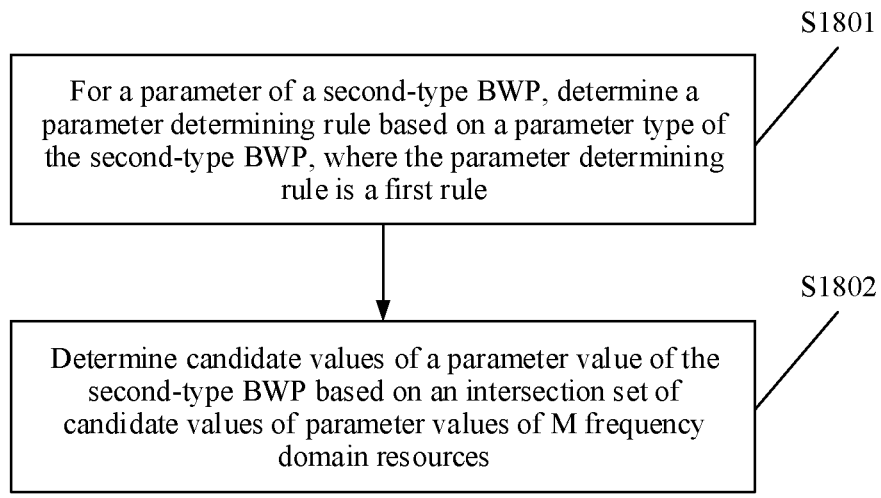
FIG. 18 is a flowchart of yet another parameter configuration method according to an embodiment of this application.

FIG. 18 is a flowchart of a parameter configuration method according to an embodiment of this application. As shown in FIG. 18, the method may include the following operations:

S1801: For a parameter of a second-type BWP, determine a parameter determining rule based on a parameter type of the second-type BWP, where the parameter determining rule is a first rule.

S1802: Determine candidate values of a parameter value of the second-type BWP based on an intersection set of candidate values of parameter values of M frequency domain resources.

For example, the parameter or the parameter type of the second-type BWP is a PDSCH time domain resource allocation.

It is assumed that one second-type BWP includes a total of two frequency domain resources: a first frequency domain resource and a second frequency domain resource. A time domain resource allocation list configured for the first frequency domain resource includes rows x1 to x16, and a time domain resource allocation list configured for the second frequency domain resource includes rows y1 to y16. It is assumed that rows x1 to x4 included in the time domain resource allocation list configured for the first frequency domain resource are the same as rows y10 to y14 included in the time domain resource allocation list configured for the second frequency domain resource, and rows x12 to x16 included in the time domain resource allocation list configured for the first frequency domain resource are the same as rows y4 to y8 included in the time domain resource allocation list configured for the second frequency domain resource. In this case, candidate values in a time domain resource allocation list of the second-type BWP may include the rows x1 to x4 or the rows y10 to y14, and the rows x12 to x16 or the rows y4 to y8.

In this embodiment of this application, the candidate values of the parameter value may sometimes be referred to as candidate values of a parameter.

In this embodiment of this application, when the candidate values of the parameter of the second-type BWP are obtained by combining candidate values of parameter values of at least two frequency domain resources, sorting of the candidate values obtained through combination needs to be determined, or in other words, the plurality of candidate values may be identified. When a network device indicates the parameter value of the second-type BWP to a terminal device by using DCI, an identifier of at least one of the plurality of candidate values may be indicated, and the terminal device determines, based on the identifier of the at least one candidate value, a parameter value configured by the network device for the terminal device.

In one embodiment, the sorting of the candidate values of the parameter of the second-type BWP may be determined based on an identifier of a frequency domain resource, or may be determined based on an attribute of a frequency domain resource. For example, for frequency domain resources corresponding to the candidate values of the parameter in the second-type BWP, the sorting is determined based on sorting of candidate values of a parameter in a frequency domain resource corresponding to a smallest identifier in identifiers of the frequency domain resources, or the sorting is determined based on sorting of candidate values of a parameter in a frequency domain resource corresponding to a largest identifier in identifiers of the frequency domain resources, or the sorting is determined based on sorting of candidate values of a parameter in a frequency resource corresponding to an identifier. For example, for the second-type BWP, the candidate values of the parameter of the second-type BWP may be sorted based on sorting in the first frequency domain resource, as shown in the first column and the second column in Table 4. Alternatively, the candidate values of the parameter of the second-type BWP may be sorted based on sorting in the second frequency domain resource, as shown in the first column and the third column in Table 4.

domain resource and/or an attribute of a frequency domain resource. For example, a priority of a frequency domain resource used for initial access (or a primary frequency domain resource or a default frequency domain resource) may be greater than a priority of a normal frequency domain resource, or a priority of a frequency domain resource with a small identifier may be greater than a priority of a frequency domain resource with a large identifier. For example, if one of the M frequency domain resources is a frequency domain resource used for initial access (or a primary frequency domain resource or a default frequency domain resource) of the terminal device, candidate values of a time domain resource allocation list of a second-type BWP including the M frequency domain resources may include some or all candidate values in a time domain resource allocation list configured for the frequency domain resource.

Alternatively, in this embodiment of this application, if a maximum quantity of rows in the time domain resource allocation list of the second-type BWP is X, X/M rows or rows of a quantity obtained by rounding up or rounding down X/M may be selected, from each frequency domain resource included in the second-type BWP, as parameters in the time domain resource allocation list of the second-type BWP. Alternatively, a parameter value of each frequency domain resource is selected based on a proportion.

In this embodiment of this application, that some or all candidate values are selected, from candidate values of a parameter of one frequency domain resource, as some or all candidate values of a parameter of a second-type BWP in which the frequency domain resource is located may be further described as follows: Candidate values of the parameter of the second-type BWP in which the frequency domain resource is located include some or all candidate values of the parameter of the frequency domain resource.

It should be noted that alternatively, parameter values of Q frequency domain resources in the M frequency domain resources may be selected, and the candidate values of the

TABLE 4

| Parameter index of the second-type BWP | Candidate values of the parameter value (based on sorting of corresponding parameter values in the first frequency domain resource) | Candidate values of the parameter value (based on sorting of corresponding parameter values in the second frequency domain resource) |
|---|---|---|
| 1 to 4 | x1 to x4 or y10 to y14 | y4 to y8 or x12 to x16 |
| 5 to 8 | x12 to x16 or y4 to y8 | y10 to y14 or x1 to x4 |

In one embodiment, the candidate values of the parameter value of the second-type BWP are determined by using the method, so that when a signal is transmitted on a frequency domain resource in the second-type BWP, data transmission can be performed on each frequency domain resource by using a uniform time domain resource allocation, thereby ensuring that a time domain resource of each frequency domain resource is available.

In this embodiment of this application, some of candidate values of a parameter value of each of the M frequency domain resources may be selected as the candidate values of the parameter value of the second-type BWP. Further, a quantity or a proportion of selected candidate values may be determined based on priorities of the M frequency domain resources. In one embodiment, the priority and/or a parameter selection method may be predefined in a protocol, or may be notified by the base station to the terminal by using signaling. For example, a priority of a selected candidate value is determined based on an identifier of a frequency parameter value of the second-type BWP are determined based on a union set of candidate values of the parameter values of the Q frequency domain resources in the M frequency domain resources, or the candidate values of the parameter value of the second-type BWP are determined based on an intersection set of candidate values of the parameter values of the Q frequency domain resources in the M frequency domain resources. Q is an integer greater than or equal to 2 and less than or equal to M.

According to the method provided in this embodiment of this application, an example in which an overhead configuration for calculating a transport block size (TBS) in parameters of the second-type BWP is used to describe the method in this embodiment of this application. The overhead configuration for calculating a transport block size is used to indicate a quantity of REs occupied by an overhead. For example, a value of an overhead parameter for calculating a transport block size may be a positive integer such as 0, 6, 8, 12, or 18. The TBS is calculated by subtracting the quantity of RE occupied by the overhead from a quantity of REs of time-frequency resources of scheduled data.

In one embodiment, for the overhead parameter configured for a data transport block size, it is assumed that the second-type BWP includes two frequency domain resources: a first frequency domain resource X1 and a second frequency domain resource X2, An overhead value configured for the frequency domain resource X1 is o1, and an overhead value configured for the frequency domain resource X2 is o2. An overhead value may be at least one of the values described above, or may be another value. This is not limited. In one embodiment, the method for determining the parameter of the second-type BWP may be at least one of the following methods:

Method (1): The parameter of the second-type BWP is determined based on a largest value in parameter values of frequency domain resources.

For example, if o1>o2, an overhead parameter value of the second-type BWP may be o1.

According to Method 1, a largest value in overheads of all frequency domain resources can be considered when data transmission is performed on the second-type BWP, all overheads of unavailable REs can be considered during data transmission, a calculated TBS is smaller, and a bitrate is reduced, thereby avoiding performance deterioration that is caused because the bitrate exceeds a maximum bitrate. A disadvantage is that an amount of transmitted data is reduced.

Method (2): The parameter of the second-type BWP is determined based on a smallest value in parameter values of frequency domain resources.

For example, if o1>o2, an overhead parameter value of the second-type BWP may be o2.

According to Method 2, a smallest value in overheads of all frequency domain resources can be considered when data transmission is performed on the second-type BWP, smallest overheads of unavailable REs can be considered during data transmission, a calculated TBS is larger, data transmission is maximized, and a data throughput is improved. A disadvantage is that a bitrate is larger, and performance may deteriorate because the bitrate is extremely large.

Method (3): The parameter of the second-type BWP is determined based on an average value or a sum of parameter values of at least two frequency domain resources or a product of parameter values of at least two frequency domain resources and a scale factor.

For example, the parameter value of the second-type BWP is determined based on an average value of parameter values of at least two frequency domain resources, for example, (o1+o2)/2 or a value obtained by rounding up or rounding down (o1+o2)/2. Alternatively, after averaging, if specified values are only 6, 8, 12, and 16, a value whose absolute value of a difference from (o1+o2)/2 is the smallest in 6, 8, 12, and 16 may be used as the parameter value of the second-type BWP. For example, if a parameter value of a frequency domain resource X1 is 6, and a parameter value o2 of a frequency domain resource X2 is 12, (o1+o2)/2=9, and a difference or an absolute value of a difference between 9 and 8 is the smallest. Therefore, the parameter value of the second-type BWP is 8. In other words, an overhead parameter value of the second-type BWP may be (o1+o2)/2 or a value obtained by rounding up or rounding down (o1+o2)/2 or a value that most meets a condition and that is obtained after a further operation.

For example, the parameter value of the second-type BWP is determined based on a sum of parameter values of at least two frequency domain resources, for example, o1+o2 or a value obtained by rounding up or rounding down o1+o2. Alternatively, after summation, if specified values are only 6, 8, 12, and 16, a value whose absolute value of a difference from o1+o2 in 6, 8, 12, and 16 is the smallest is found and used as the parameter value of the second-type BWP. For example, if a parameter value o1 of a frequency domain resource X1 is 6, and a parameter value o2 of a frequency domain resource X2 is 12, a sum is 18, and a difference between 18 and 18 is the smallest. Therefore, the parameter value of the second-type BWP is 18.

For example, the parameter value of the second-type BWP is determined based on a product of parameter values of at least two frequency domain resources and a scale factor, for example, o1*w1+o2*w2 or (o1+o2)*w3 or a value obtained by rounding up or rounding down o1*w1+o2*w2 or (o1+o2)*w3. Alternatively, after the parameter values are multiplied by the scale factor, if specified values are only 6, 8, 12, and 16, a value whose absolute value of a difference from o1*w1+o2*w2 or (o1+o2)*w3 in 6, 8, 12, and 16 is the smallest is found and used as the parameter value of the second-type BWP. The scale factors w1, w2, and w3 are real numbers, for example, may be 0.2, 0.8, and 0.4. Values of the scale factors may be predefined in a protocol, or may be notified by the network device to the terminal device by using signaling. For example, if a parameter value o1 of a frequency domain resource X1 is 6, and a parameter value o2 of a frequency domain resource X2 is 12, in an example in which w3 is 0.2, (o1+o2)*0.2 is 18*0.2=3.6, and a difference or an absolute value of a difference between 3.6 and 6 is the smallest. Therefore, the parameter value of the second-type BWP is 6.

In other words, an overhead parameter value of the second-type BWP, the BWP bundle, or the BWP group may be o1*w1+o2*w2 or (o1+o2)*w3 or a value that most meets a condition and that is obtained after a further operation.

According to Method 3, overhead parameter values of all frequency domain resources can be fully considered when data transmission is performed on the second-type BWP, proper overheads of unavailable REs can be considered during data transmission, a calculated TBS is not excessively large or small, data transmission is performed properly and effectively, and a data throughput is improved.

Method (4): The parameter of the second-type BWP is determined based on parameter values of at least two frequency domain resources.

For example, during calculation of a TBS, a plurality of TBS values may be separately determined for parameter values of a plurality of frequency domain resources allocated in the second-type BWP or the BWP bundle or the BWP group, and then the plurality of TBS values are added.

For example, the second-type BWP, the BWP bundle, or the BWP group includes a frequency domain resource X1 and a frequency domain resource X2. An overhead value of the frequency domain resource X1 is o1, and an overhead value of the frequency domain resource X2 is o2. Based on a resource allocated through data scheduling, for example, if a time-frequency resource allocated on the frequency domain resource X1 in the second-type BWP is R1, a quantity of available REs for calculating a TBS for a resource on the frequency domain resource X1 may be determined based on R1-o1 or a value obtained by further subtracting an RE of another reference signal such as a DMRS or through another operation. This is not limited in this application. A TBS of the frequency domain resource X1 is a TBS 1. For example, if a time-frequency resource allocated on the frequency domain resource X2 in the second-type BWP is R2, a quantity of available REs for calculating a TBS for a resource on the frequency domain resource X2 may be determined based on R2-o2 or a value obtained by further subtracting an RE of another reference signal such as a DMRS or through another operation. This is not limited in this application. A TBS of the frequency domain resource X2 is a TBS 2.

In other words, a plurality of TBSs corresponding to a plurality of frequency domain resources may be determined based on respective resources scheduled for the plurality of frequency domain resources. A TBS of the second-type BWP may be further determined based on at least one of the following methods:

A1: The plurality of TBSs are added to obtain a temporary TBS, and then at least one of subsequent TBS processing is performed, for example, a nearest TBS is searched for based on a table, or the temporary TBS is quantized as a multiple of 8, or processing such as coded block segmentation is performed. A TBS obtained through processing is used as the TBS of the second-type BWP.

A2: At least one of subsequent TBS processing is separately performed on the plurality of TBSs, for example, a nearest TBS is searched for based on a table, or the TBSs are quantized as multiples of 8, or processing such as coded block segmentation is performed. Then a plurality of TBSs obtained through processing are added to obtain the TBS of the second-type BWP.

In one embodiment, which of the method A1 and the method A2 is used may be predefined in a protocol, or may be notified by the network device to the terminal device by using signaling. This is not limited in this application.

According to Method 4, a TBS corresponding to each frequency domain resource can be calculated for an overhead parameter value of the frequency domain resource when data transmission is performed on the second-type BWP, proper overheads of unavailable REs can be considered during data transmission, a calculated TBS is not excessively large or small, data transmission is performed properly and effectively, and a data throughput is improved.

In one embodiment, which of Method (1), Method (2), Method (3), and Method (4) is used may be predefined in a protocol, or may be notified by the network device to the terminal device by using signaling. This is not limited in this application.

In one embodiment, any one of Method (1), Method (2), Method (3), and Method (4) may also be applied to another parameter of the second-type BWP. This is not limited in this application. In one embodiment, the another parameter may be any parameter described in the embodiments of this application.

For the second implementable manner, when the parameter determining rule is the second rule, the following embodiments such as the following Method 1 to Method 3 may be included.

Figure 19:
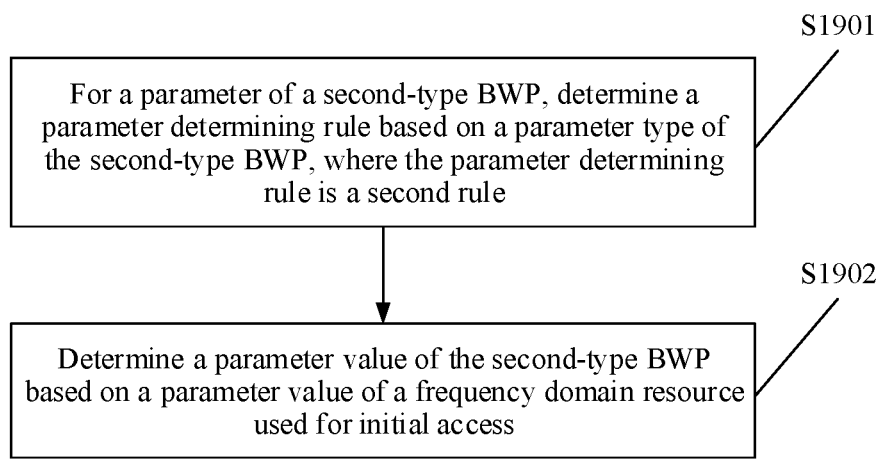
FIG. 19 is a flowchart of yet another parameter configuration method according to an embodiment of this application.

FIG. 19 is a flowchart of a parameter configuration method (Method 1 in the second implementable manner) according to an embodiment of this application. As shown in FIG. 19, the method may include the following operations:

S1901: For a parameter of a second-type BWP, determine a parameter determining rule based on a parameter type of the second-type BWP, where the parameter determining rule is a second rule.

S1902: Determine a parameter value of the second-type BWP based on a parameter value of a frequency domain resource used for initial access.

Figure 20:
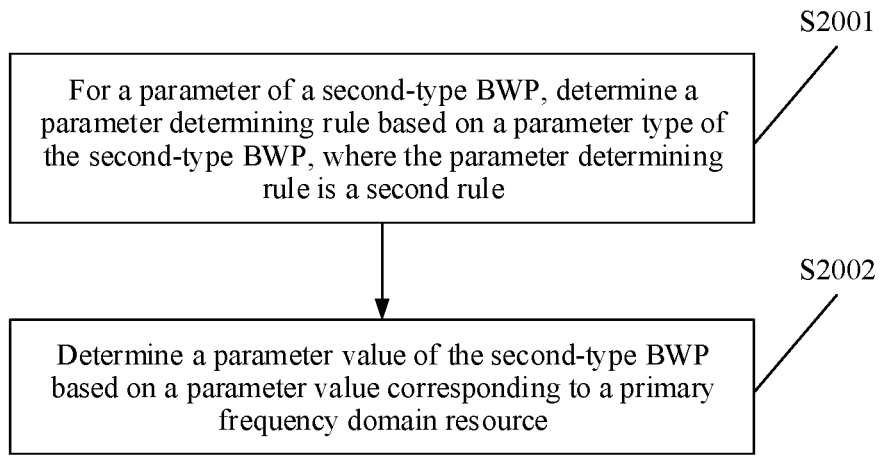
FIG. 20 is a flowchart of yet another parameter configuration method according to an embodiment of this application.

FIG. 20 is a flowchart of a parameter configuration method (Method 2 in the second implementable manner) according to an embodiment of this application. As shown in FIG. 20, the method may include the following operations:

S2001: For a parameter of a second-type BWP, determine a parameter determining rule based on a parameter type of the second-type BWP, where the parameter determining rule is a second rule.

S2002: Determine a parameter value of the second-type BWP based on a parameter value corresponding to a primary frequency domain resource.

An embodiment of this application may further provide a parameter configuration method (Method 3 in the second implementable manner). The method may include:

for a parameter of a second-type BWP, determining a parameter determining rule based on a parameter type of the second-type BWP, where the parameter determining rule is a second rule; and determining a parameter value of the second-type BWP based on a parameter value corresponding to a default frequency domain resource.

In the embodiments of this application, the frequency domain resource used for initial access or the primary frequency domain resource or the default frequency domain resource may be a frequency domain resource included in the second-type BWP. It is assumed that one second-type BWP includes a total of two frequency domain resources: a first frequency domain resource and a second frequency domain resource. If the first frequency domain resource is a frequency domain resource used for initial access, a parameter value of the first frequency domain resource is determined as the parameter value of the second-type BWP. If the second frequency domain resource is a frequency domain resource used for initial access, a parameter value of the second frequency domain resource is determined as the parameter value of the second-type BWP.

In one embodiment, the parameter value of the second-type BWP may be determined with reference to both identifiers of M frequency domain resources and attributes of the frequency domain resources. For example, if there are two primary frequency domain resources in the second-type BWP, a parameter value of a frequency domain resource with a smaller identifier in the primary frequency domain resources may be selected as the parameter value of the second-type BWP.

Parameter determining rules corresponding to different parameter types of second-type BWPs may be different or may be the same.

In one embodiment, the following describes the foregoing methods available for determining the parameter or the parameter type of the second-type BWP.

In one embodiment, for a configuration of a PDSCH, a PUSCH, semi-persistent scheduling (SPS), or a configured grant, one or more of the following parameters may be included:

1. Data scrambling identifier. The parameter value may be determined by using Method 1 or Method 2 in the first implementable manner or any method in the second implementable manner.

2. Downlink demodulation reference signal (DMRS) configuration, used to indicate a related configuration of a downlink DMRS. The parameter value may be determined by using Method 1 or Method 2 in the first implementable manner or Method 1 or Method 2 in the second implementable manner.

3. Transmission configuration indication (TCI) state configuration, used to indicate quasi-colocation QCL (quasi-colocation) information. The parameter value may be determined by using Method 1 or Method 3 in the first implementable manner or any method in the second implementable manner.

4. VRB to PRB interleaver, used to indicate a size of aggregated RBs during interleaving, which, for example, may be 2 or 4. The parameter value may be determined by using Method 1 or Method 2 in the first implementable manner or any method in the second implementable manner.

5. Resource allocation, used to indicate a resource allocation type, which, for example, may be a resource allocation type 0 or a resource allocation type 1 or dynamically switches between a resource allocation type 0 and a resource allocation type 1. The parameter value may be determined by using Method 1 or Method 2 in the first implementable manner or any method in the second implementable manner.

6. PDSCH time domain resource allocation list. The parameter value may be determined by using Method 1 or Method 3 in the first implementable manner or any method in the second implementable manner.

7. PDSCH aggregation factor. The parameter value may be determined by using Method 1 or Method 2 in the first implementable manner or any method in the second implementable manner.

8. Rate matching pattern, used to indicate a location of a rate-matched resource during data transmission. No data is transmitted (or received) on the location of the resource. Higher layer signaling may be used to configure one or more rate matching patterns (or sets), and DCI may indicate one rate matching pattern (or set) for rate matching. The parameter value may be determined by using Method 1 or Method 3 in the first implementable manner or any method in the second implementable manner.

9. RBG size. The parameter value may be determined by using Method 1 or Method 2 in the first implementable manner or any method in the second implementable manner.

10. MCS table configuration, used to indicate an MCS table used during DCI scheduling. A modulation scheme and/or a bitrate of data transmission may be determined based on the table and an indication in corresponding DCI. For example, in LTE or NR, there may be an MCS table for QAM64 and an MCS table for QAM256. The parameter value may be determined by using Method 1 or Method 2 in the first implementable manner or any method in the second implementable manner.

11. Maximum quantity of codewords during DCI scheduling, used to indicate a maximum quantity of codewords during DCI scheduling. For example, the quantity may be 1 or 2, and determines an information field in DCI. The parameter value may be determined by using Method 1 or Method 2 in the first implementable manner or any method in the second implementable manner.

12. Precoding RB aggregation type, used to indicate a quantity of aggregated RBs during precoding. For example, same precoding may be used for two RBs, same precoding may be used for four RBs, or same precoding may be used for entire bandwidth. Joint channel estimation may be performed on RBs for which same precoding is used, to improve channel estimation performance, and precoding gains may also be obtained for different RBs for which different precoding is used. The parameter value may be determined by using Method 1 or Method 2 in the first implementable manner or any method in the second implementable manner.

13. Zero power channel state information-reference signal (CSI-RS) resource, used to indicate a zero power CSI-RS resource. Further, a rate matching indication may be performed based on the zero power CSI-RS resource. Sending may be performed periodically, non-periodically, or semi-persistently. Higher layer signaling may be used to configure one or more zero power CSI-RS resources, and DCI may trigger one of the resources for rate matching. The parameter value may be determined by using Method 1 or Method 3 in the first implementable manner or any method in the second implementable manner.

In one embodiment, for a physical uplink shared channel (PUSCH), one or more of the following parameters or parameter types may be included:

1. Transmission configuration (txConfig), which may include precoding transmission or non-precoding transmission, and may be used to indicate an uplink signal transmission type. The parameter value may be determined by using Method 1 in the first implementable manner or any method in the second implementable manner.

2. Uplink power control (PUSCH-power control), which may be used to indicate a related parameter of an uplink power configuration. The parameter value may be determined by using Method 1 or Method 2 in the first implementable manner or any method in the second implementable manner.

3. Frequency hopping configuration, which may include a mode 1 and a mode 2, and is used to indicate a frequency hopping mode. The parameter value may be determined by using Method 1 in the first implementable manner or any method in the second implementable manner.

4. Frequency hopping offset, used to indicate an offset of a frequency hopping RB. The parameter value may be determined by using Method 1 or Method 2 in the first implementable manner or any method in the second implementable manner.

5. Transform precoding, used to indicate whether uplink transmission is single-carrier or multi-carrier transmission. If the transform precoding is enabled, it indicates that uplink transmission is single-carrier transmission. The parameter value may be determined by using Method 1 in the first implementable manner or any method in the second implementable manner.

6. Codebook subset configuration, used to indicate an uplink codebook type, which, for example, may be a non-coherent codebook (nonCoherent), a partially coherent codebook and a noncoherent codebook (partialAndNonCoherent), and a coherent codebook, a partially coherent codebook, and a noncoherent codebook (fullyAndPartialAndNonCoherent). The parameter value may be determined by using Method 1 in the first implementable manner or any method in the second implementable manner.

7. Maximum rank value (maxrank), used to indicate a maximum quantity of uplink data transmission layers. The parameter value may be determined by using Method 1 or Method 2 in the first implementable manner or any method in the second implementable manner.

8. Carrying uplink control information in a PUSCH, used to indicate a related parameter when uplink control information is carried in the PUSCH. The parameter value may be determined by using the first implementable manner or the second implementable manner.

9. Offset value set. There may be two types. One type is dynamic, a plurality of sets may be configured at a higher layer, and DCI indicates another set. The other type is semi-static, in other words, only one set is configured at a higher layer, and no DCI indication is required. The set may include at least one of the following: an offset fed back by an acknowledgement (ACK)/negative acknowledgement (NACK), a first-part offset reported by channel state information (CSI), a second-part offset reported by CSI, and the like. An offset value is used to determine a quantity of resources used for an Ack/Nack and CSI when Ack/Nack and/or CSI are or is multiplexed on a PUSCH. The parameter value may be determined by using the first implementable manner or the second implementable manner.

10. Scale factor (scaling), used to indicate a limitation on a quantity of resources allocated to uplink control information (UCI) on a PUSCH. For example, a value f0p5 indicates 0.5, in other words, the value indicates that a quantity of resources of UCI cannot exceed ½ of a quantity of PUSCH resources. For example, a value f0p65 indicates 0.65, in other words, the value indicates that a quantity of resources of UCI cannot exceed 0.65 of a quantity of PUSCH resources. The parameter value may be determined by using Method 1 or Method 2 in the first implementable manner or any method in the second implementable manner.

In one embodiment, for SPS, one or more of the following parameters may be included:

1. Period, used to configure a period of SPS transmission. The parameter value may be determined by using Method 1 or Method 2 in the first implementable manner or any method in the second implementable manner.

2. Quantity of hybrid automatic repeat request (HARQ) processes, used to indicate a quantity of HARQ processes. The parameter value may be determined by using Method 1 or Method 2 in the first implementable manner or any method in the second implementable manner.

3. PUCCH resource identifier, used to indicate a PUCCH resource. The parameter value may be determined by using the first implementable manner or the second implementable manner.

In one embodiment, for a configuration of a configured grant, one or more of the following parameters may be included:

1. Power configuration parameter. The parameter value may be determined by using Method 1 or Method 2 in the first implementable manner or any method in the second implementable manner.

2. Power parameter. The parameter value may be determined by using Method 1 or Method 2 in the first implementable manner or any method in the second implementable manner.

3. Quantity of repetition times, used to indicate a quantity of slots occupied by one time of scheduling or a quantity of repetition times. The parameter value may be determined by using Method 1 or Method 2 in the first implementable manner or any method in the second implementable manner.

4. Redundancy version of repeated transmission, used to indicate a redundancy version of each time of repeated transmission. The parameter value may be determined by using Method 1 in the first implementable manner or any method in the second implementable manner.

5. Period, used to indicate a data transmission period. The parameter value may be determined by using Method 1 or Method 2 in the first implementable manner or any method in the second implementable manner.

6. RRC configured uplink scheduling information. The parameter value may be determined by using the first implementable manner or the second implementable manner.

6.1: Time domain offset. The parameter value may be determined by using Method 1, Method 2, or Method 3 in the first implementable manner or any method in the second implementable manner.

6.2: Time domain resource allocation. The parameter value may be determined by using Method 1 or Method 3 in the first implementable manner or any method in the second implementable manner.

6.3: Frequency domain resource allocation. The parameter value may be determined by using Method 1 or Method 3 in the first implementable manner or any method in the second implementable manner.

6.4: Antenna port indication, used to indicate a quantity of antenna ports and/or layers for data transmission. The parameter value may be determined by using Method 1 or Method 2 in the first implementable manner or any method in the second implementable manner.

6.5: DMRS sequence initialization, used to indicate a scrambling identifier of DMRS sequence initialization. The parameter value may be determined by using Method 1, Method 2, or Method 3 in the first implementable manner or any method in the second implementable manner.

6.6: Precoding and quantity of layers, used to indicate uplink precoding and the quantity of layers. The parameter value may be determined by using Method 1 or Method 3 in the first implementable manner or any method in the second implementable manner.

6.7: SRS resource indication, used to indicate an SRS resource to determine an SRS resource that has a same large-scale property as data. The parameter value may be determined by using the first implementable manner or the second implementable manner.

6.8: Modulation scheme, bitrate, and TBS, used to indicate an MCS. The parameter value may be determined by using Method 1 or Method 2 in the first implementable manner or any method in the second implementable manner.

6.9: Frequency hopping offset configuration. The parameter value may be determined by using the first implementable manner or the second implementable manner.

6.10. Path loss reference indication, used to indicate a reference signal that may be referenced for a path loss of data transmission. The parameter value may be determined by using the first implementable manner or the second implementable manner.

In the embodiments of this application, a parameter value corresponding to a frequency domain resource indicated by the network device may be alternatively determined as the parameter value of the second-type BWP. The terminal device determines, based on the indicated parameter value, the parameter value of the parameter corresponding to the second-type BWP. For example, the network device indicates that a first frequency domain resource included in the second-type BWP is used as the parameter value of the second-type BWP. In one embodiment, the network device may send signaling by using higher layer signaling or physical layer signaling to indicate the frequency domain resource, and the terminal device determines the parameter value of the second-type BWP based on a parameter value corresponding to the frequency domain resource indicated by the network device.

In one embodiment, when parameters of the second-type BWP are configured, some parameters may be configured at a first-type BWP level, and others may be configured at a second-type BWP level. In this way, signaling configuration overheads can be reduced. For a parameter configured for a second-type BWP, a parameter value for performing data transmission on one second-type BWP can be determined based on only one configured parameter value.

In one embodiment, one second-type BWP includes N first-type BWPs. When a parameter is configured at the first-type BWP level, when a parameter value of the parameter is configured for the second-type BWP, the parameter value of the parameter may be configured for each first-type BWP in the second-type BWP.

In one embodiment, one second-type BWP includes N first-type BWPs. When a parameter is configured at the second-type BWP level, a parameter value of the parameter is configured for the second-type BWP, and the configured parameter value is used when data transmission is performed in the first-type BWP in the second-type BWP.

In one embodiment, for example, at least one of the following parameters may be configured at the first-type BWP level.

For example, at least one of the following may be configured for downlink: an identifier of a BWP, a first PRB (a start RB) and a quantity of consecutive PRBs, and a downlink control channel configuration. In one embodiment, the downlink control channel configuration may be particular only to a primary BWP or a default BWP.

For example, at least one of the following may be configured for uplink: an identifier of a BWP, a first PRB (a start RB) and a quantity of consecutive PRBs, and an uplink control channel configuration. In one embodiment, the uplink control channel configuration may be particular only to a primary BWP or a default BWP.

In one embodiment, for example, at least one of the following parameters may be configured at the second-type BWP level.

For example, at least one of the following may be configured for downlink: a subcarrier spacing, a CP length, a PDSCH configuration, an SPS configuration, and a radio link detection configuration.

For example, at least one of the following may be configured for uplink: a subcarrier spacing, a CP length, a PUSCH configuration, an SRS configuration, and a beam failure re-establishment configuration.

In one embodiment, for determining a parameter of a second-type BWP, a parameter value used for data transmission of the second-type BWP may be determined based on a default parameter value.

For example, the parameter may be determined based on a predefined parameter specified in a protocol.

For example, a data scrambling identifier is used to indicate a data scrambling identifier and may be predefined as a cell ID or a UE ID.

For example, a parameter value of a downlink DMRS configuration may be predefined as a configuration 1 and a single symbol.

For example, a TCI state configuration is used to indicate quasi-colocation QCL information. By default, there may be no configuration, and QCL of data is determined based on QCL of a PDCCH.

For example, a VRB to PRB interleaver is used to indicate a size of aggregated RBs during interleaving, which, for example, may be 2 or 4.

For example, a resource allocation is used to indicate a resource allocation type, which, for example, may be a resource allocation type 0 or a resource allocation type 1 or dynamically switches between a resource allocation type 0 and a resource allocation type 1. A default type may be the type 1, or a type dynamically switch by default.

For example, for a PDSCH time domain resource allocation list, a predefined time domain resource allocation table or a time domain resource allocation table configured by using system information may be used by default.

For example, for a PDSCH aggregation factor, by default, there is no aggregation, in other words, a value is 1, or a default value is F, where F is a positive integer.

For example, for a rate matching pattern, by default, there is no configuration, and no rate matching is performed.

For example, an RBG size may be a configuration 1 by default.

For example, for an MCS table configuration, there may be an MCS table for 64QAM by default.

For example, for a maximum quantity of codewords during DCI scheduling, the maximum quantity of codewords may be 1 by default.

For example, a precoding RB aggregation type may be entire bandwidth by default.

In one embodiment, for example, if parameters of at least two of a plurality of frequency domain resources included in the second-type BWP are different, the parameter of the second-type BWP may be determined based on a default parameter.

For example, if parameters configured for all of a plurality of BWPs included in the second-type BWP are the same, the parameter of the second-type BWP may be determined based on the configured parameters.

With reference to the accompanying drawings, the following describes in detail a method for configuring a resource of a bandwidth part by a terminal device and a network device. Certainly, the resource configuration method may be alternatively implemented by another communications device that supports a terminal device, for example, a chip in the terminal device, or the resource configuration method may be implemented by another communications device that supports a network device, for example, a chip in the network device, and this is not limited in the embodiments of this application.

After a resource is determined according to the resource configuration method, the network device and the terminal device may perform data transmission on the resource, for example, may perform downlink data transmission and/or uplink data transmission.

Figure 21:
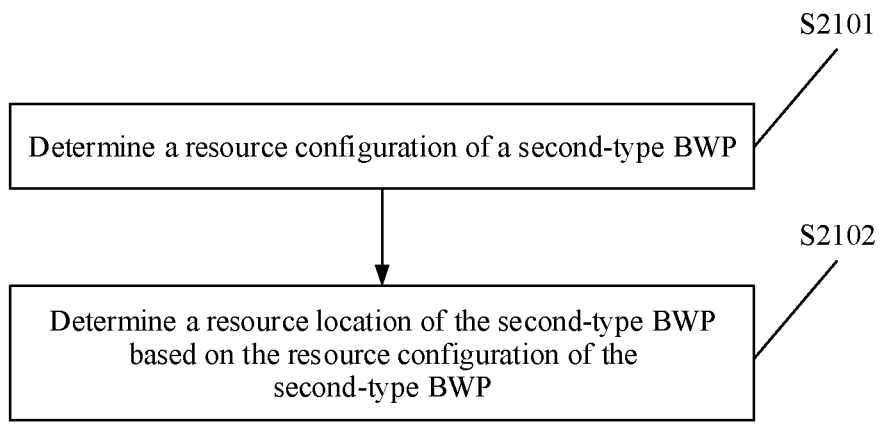
FIG. 21 is a flowchart of yet another parameter configuration method according to an embodiment of this application.

FIG. 21 is a flowchart of a resource configuration method according to an embodiment of this application. As shown in FIG. 21, the method may include the following operations.

S2101: Determine a resource configuration of a second-type BWP.

The second-type BWP includes N frequency domain resources, N is a positive integer, and N is greater than or equal to 2. One of the N frequency domain resources may be a first-type BWP. In a wireless communications system, for example, a release 15 (R15) of a 5G standard or evolution thereof, the first-type BWP is a segment of consecutive frequency domain resources. A configuration of the first-type BWP may include a frequency start RB, bandwidth (BW), and a corresponding parameter (numerology) of the first-type BWP. The bandwidth refers to a quantity of RBs included in the first-type BWP, and the parameter includes at least one of a subcarrier spacing and a cyclic prefix.

In this embodiment of this application, a network device may configure a bandwidth part for a terminal device by using the following three offsets.

First offset (offset 1): The terminal device determines a reference point A based on a reference frequency location (reference location) and a first offset (offset 1) relative to the reference frequency location, and determines a common RB index based on the reference point A. Different subcarrier spacings SCS=$2^{\mu}$*15 kHz correspond to respective common RB indexes. For example, an RB 0 and an RB 1 of 15 kHz may correspond to an RB 0 of 30 kHz, and an RB 0 and an RB 1 of 30 kHz may correspond to an RB 0 of 60 kHz. Similarly, different subcarrier spacings correspond to respective common RB indexes, subcarriers 0 of common RBs 0 in common RBs corresponding to different subcarrier spacings all include the reference point A, and the common RBs are numbered from the common RB 0 in ascending order of frequencies. For example, for a primary-cell downlink carrier, a reference frequency location is determined based on an RB with a lowest frequency of a synchronization signal block received by the terminal device. For a primary-cell uplink carrier in an unpaired spectrum, a reference frequency location is determined based on an RB with a lowest frequency of a synchronization signal block received by the terminal device. For a primary-cell uplink carrier in a paired spectrum, a reference frequency location is determined based on a frequency location configured by the base station, and the frequency location may correspond to one absolute radio frequency channel number (ARFCN). For a secondary cell, a reference frequency location is determined based on a frequency location configured by the base station, and the frequency location may correspond to one absolute radio frequency channel number. For a supplementary uplink carrier, a reference frequency location is determined based on a frequency location configured by the base station, and the frequency location may correspond to one absolute radio frequency channel number. The unpaired spectrum may mean that in a TDD scenario, an uplink carrier and a downlink carrier are a same carrier, and the uplink carrier and the downlink carrier is in the unpaired spectrum. The paired spectrum may mean that in an FDD scenario, an uplink carrier and a downlink carrier are two carriers, and the uplink carrier and the downlink carrier is in the paired spectrum.

Second offset (offset 2): The terminal device determines a lowest RB location of a virtual carrier based on a reference point A or a common RB 0 and a second offset relative to the reference point A or the common RB 0. The terminal device may further determine the virtual carrier based on virtual carrier bandwidth configured by the network device. The virtual carrier may also be referred to as a logical carrier, a terminal device-specific carrier, an available RB, available bandwidth, or the like. The terminal device may determine a resource grid and an OFDM baseband signal based on the virtual carrier, and place an RF transceiver and/or perform filtering. For example, generation of the OFDM baseband signal is determined based on a size of the virtual carrier, that is, a quantity of RBs included in the virtual carrier. In an example of a virtual carrier with consecutive frequencies, assuming that the virtual carrier includes $N_{grid}^{size}$ RBs, the OFDM baseband signal may be represented as follows:

$$S_l(t) = \sum_{k=0}^{N_{grid}^{size} N_{sc}^{RB}-1} a_{k,l} \cdot e^{j2\pi(k+k_0-N_{grid}^{size} N_{sc}^{RB}/2)\Delta f(t-N_{CP,l}T_c-t_{start,l})},$$

where
$N_{sc}^{RB}$ represents a quantity of subcarriers included in one RB, where for example, $N_{sc}^{RB}=12$, $k_0$ represents a subcarrier-level offset configured by the network device, $\Delta f$ represents a subcarrier spacing, $N_{CP,l}$ represents a CP length of the $l^{th}$ symbol, $T_c$ represents a predefined time domain unit, and is determined based on a maximum subcarrier spacing supported by a system and a quantity of FFT points, where for example, if the maximum subcarrier spacing supported by the system is 480 kHz, and the quantity of FFT points is 4096, $T_c=1/(480 \cdot 10^3 \cdot 4096)$, and $t_{start,l}$ represents a time domain location of the $l^{th}$ symbol or a time domain offset from the $0^{th}$ symbol.

Third offset (offset 3): an offset of a lowest RB location of a BWP relative to a lowest RB location of a virtual carrier. The terminal device determines a start RB of the BWP based on the offset. Further, bandwidth of the BWP may be configured, so that the terminal device can determine a location of the BWP in a carrier based on the start RB and an RB length.

In this embodiment of this application, for descriptions of the offset 1, the offset 2, and the offset 3, refer to a 5G standard protocol or evolution thereof. The offset 1, the offset 2, and the offset 3 may be used for a first-type BWP.

Figure 22:
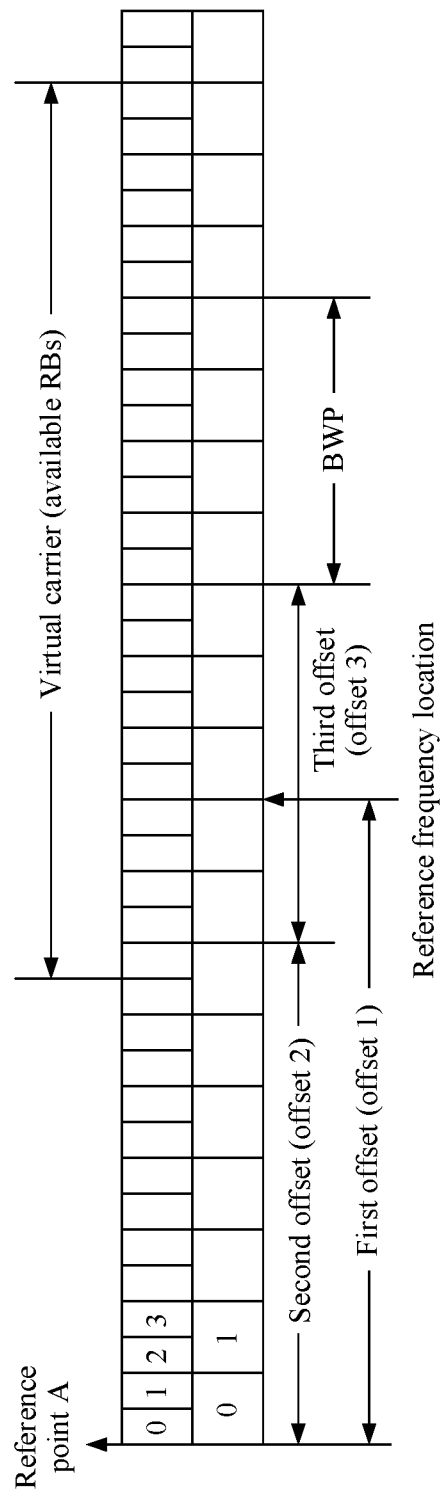
FIG. 22 is an example diagram of a resource location of a BWP according to an embodiment of this application.

FIG. 22 is an example diagram of a resource location of a second-type BWP according to an embodiment of this application.

For the second-type BWP, to implement a nonconsecutive resource configuration, a resource configuration may be performed on each of N frequency domain resources included in the second-type BWP. Resource configuration information for a resource configuration of a frequency domain resource should include at least a start location and bandwidth of the frequency domain resource. For example, the bandwidth may be a quantity or a length of RBs included in the frequency domain resource. The resource configuration further includes at least one second offset and at least one reference point.

Figure 23:
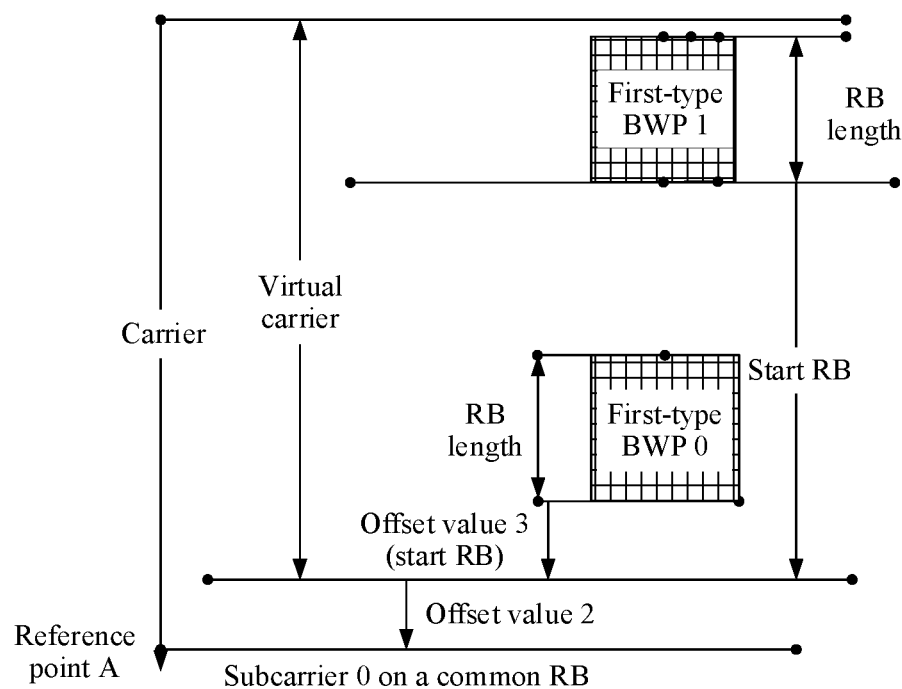
FIG. 23 is an example diagram of a resource location of a second-type BWP according to an embodiment of this application.

In one embodiment, for the second-type BWP, in a first possible implementation, the resource configuration is used to indicate one reference point, one second offset (offset 2), and N pieces of frequency domain resource information. The N pieces of frequency domain resource information respectively correspond to the N frequency domain resources. One reference point and one second offset (offset 2) may be shared for determining resource locations of the N frequency domain resources. One piece of frequency domain resource information includes a start location and bandwidth of a frequency domain resource corresponding to the frequency domain resource information. The bandwidth may be a quantity or a length of RBs included in the frequency domain resource. FIG. 23 is an example diagram of a resource location of a second-type BWP according to an embodiment of this application.

In one embodiment, when the network device indicates the resource configuration of the second-type BWP to the terminal device by using signaling, a reference point, a second offset, and a frequency domain resource information indication may be in same signaling, or may be in different signaling.

Figure 24:
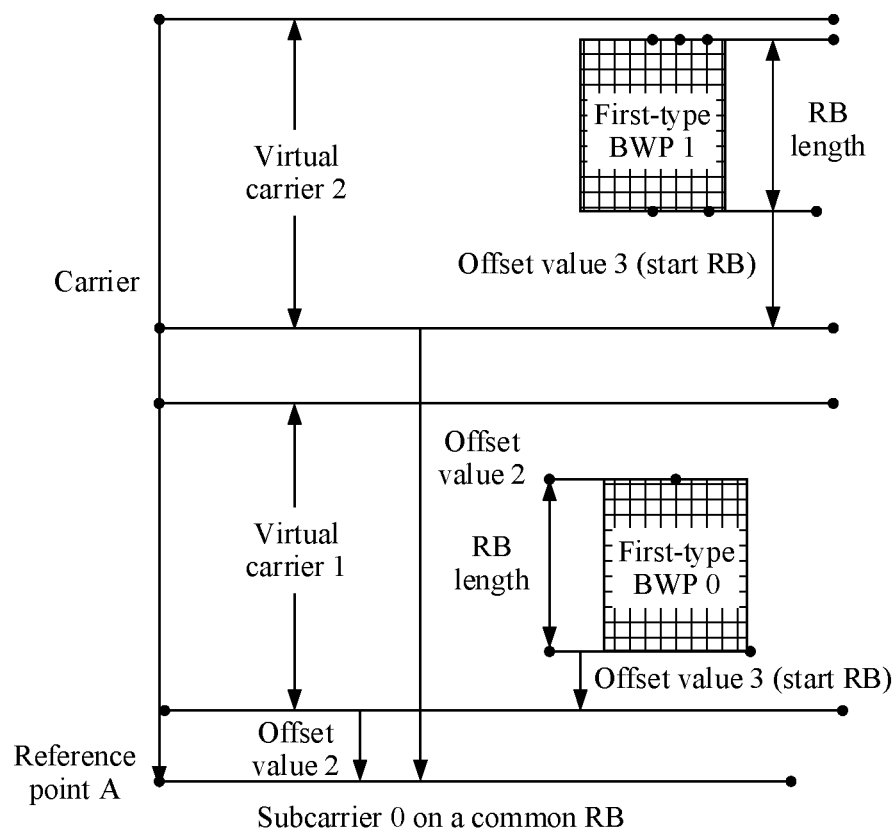
FIG. 24 is an example diagram of a resource location of another second-type BWP according to an embodiment of this application.

In a second possible implementation, the resource configuration is used to indicate one reference point, N offsets 2, and N pieces of frequency domain resource information. One reference point and N offsets 2 may be shared for determining resource locations of the N frequency domain resources. One piece of frequency domain resource information includes a start location and bandwidth of a frequency domain resource corresponding to the frequency domain resource information. The N offsets 2 respectively correspond to the N frequency domain resources. The N pieces of frequency domain resource information respectively correspond to the N frequency domain resources. FIG. 24 is an example diagram of a resource location of a second-type BWP according to an embodiment of this application. In one embodiment, the resource configuration may be used to indicate one reference point, R offsets 2, and N pieces of frequency domain resource information. R is an integer greater than 2, and R is less than N. In this scenario, one reference point may be shared for determining resource locations of the N frequency domain resources, and one offset 2 may be shared for determining resource locations of at least two of the N frequency domain resources. For example, one second-type BWP includes a total of three frequency domain resources: a first frequency domain resource, a second frequency domain resource, and a third frequency domain resource. The resource configuration may be alternatively used to indicate one reference point, two offsets 2, and three pieces of frequency domain resource information. One reference point may be shared for determining resource locations of the three frequency domain resources, and a first offset 2 may be used to determine a resource location of the first frequency domain resource, and a second offset 2 may be used to determine a resource location of the second frequency domain resource and a resource location of the third frequency domain resource. Each piece of frequency domain resource information includes a start location and bandwidth of a frequency domain resource corresponding to the frequency domain resource information.

In one embodiment, when the network device indicates the resource configuration of the second-type BWP to the terminal device by using signaling, a reference point, a second offset, and a frequency domain resource information indication may be in same signaling, or may be in different signaling.

Figure 25:
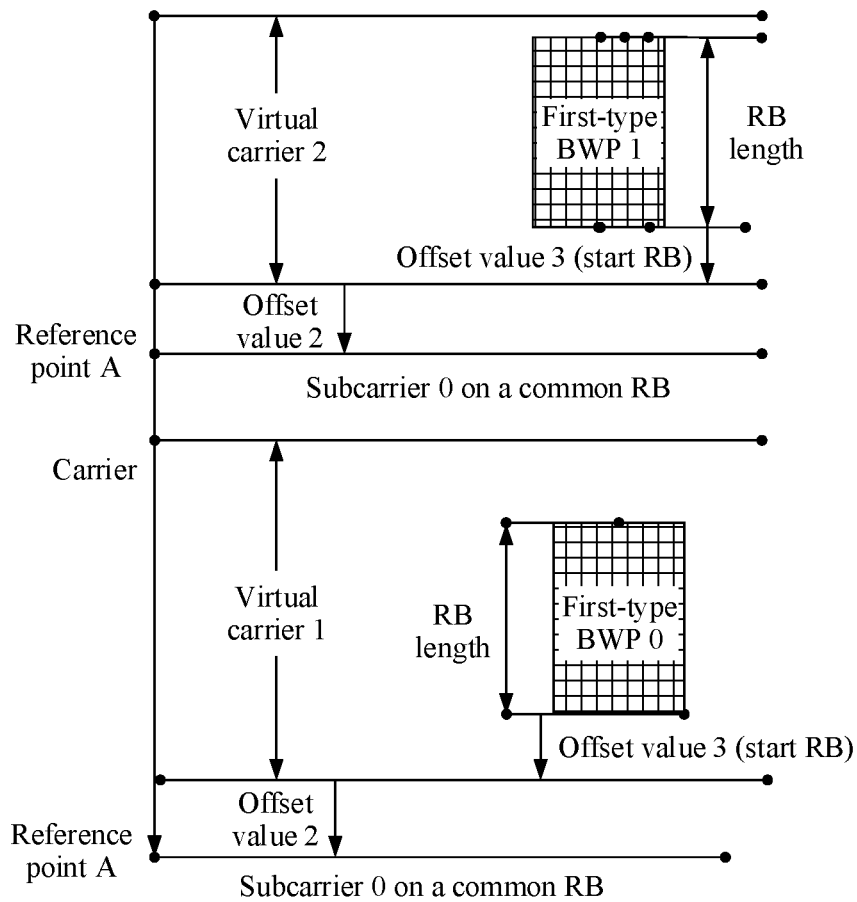
FIG. 25 is an example diagram of a resource location of still another second-type BWP according to an embodiment of this application.

In a third possible implementation, the resource configuration is used to indicate N reference points, N offsets 2, and N pieces of frequency domain resource information corresponding to the N frequency domain resources. The N reference points and the N offsets 2 may be used to determine resource locations of the N frequency domain resources, and a reference point and an offset 2 corresponding to a frequency domain resource may be used to determine a resource location of the frequency domain resource. One piece of frequency domain resource information includes a start location and bandwidth of a frequency domain resource corresponding to the frequency domain resource information. The N pieces of frequency domain resource information respectively correspond to the N frequency domain resources. FIG. 25 is an example diagram of a resource location of a second-type BWP according to an embodiment of this application.

In one embodiment, when the network device indicates the resource configuration of the second-type BWP to the terminal device by using signaling, a reference point, a second offset, and a frequency domain resource information indication may be in same signaling, or may be in different signaling.

In one embodiment, when the network device indicates the resource configuration of the second-type BWP to the terminal device by using signaling, a reference point, a second offset, and frequency domain resource information may be configured for each first-type BWP included in the second-type BWP.

In one embodiment, when a resource configuration is performed on the second-type BWP, a reference point and/or a second offset may be configured at a first-type BWP level. For example, the second-type BWP includes N first-type BWPs. During a resource configuration of the second-type BWP, a resource location of the second-type BWP is determined by using identifiers indicating the N first-type BWPs. For each first-type BWP, an identifier of the first-type BWP and a reference point, a second offset, and frequency domain resource information corresponding to the first-type BWP may be configured. In one embodiment, the frequency domain resource information includes a resource indication value (RIV). The resource indication value is used to indicate a start location of the frequency domain resource and a length of an RB included in the frequency domain resource. A definition of the RIV may be as follows:

If $(L_{RBs}-1) \leq \lfloor N_{BWP}^{size}/2 \rfloor$, $RIV = N_{BWP}^{size}(L_{RBs}-1) + RB_{start}$; or otherwise, $RIV = N_{BWP}^{size}(N_{BWP}^{size} - L_{RBs} - 1) + (N_{BWP}^{size} - 1 - RB_{start})$, where $RB_{start}$ represents a start location of a frequency domain resource, $L_{RBs}$ represents a length of an RB included in the frequency domain resource, $L_{RBs}$ is greater than or equal to 1 but does not exceed $N_{BWP}^{size} - RB_{start}$, $N_{BWP}^{size}$ represents a size of a BWP, and $N_{BWP}^{size}$ is a positive integer such as 275, where in this case, a value of the RIV may be 0 to 275*276-1, that is, 0 to 37949, in other words, a start RB and a quantity of RBs may be indicated in 275 RBs.

In a fourth possible implementation, the resource information is used to indicate N pieces of carrier information and N pieces of frequency domain resource information, and the carrier information is used to indicate a carrier on which the frequency domain resource is located. For example, the carrier information includes one reference point and one offset value (offset 2). In one embodiment, the N pieces of carrier information correspond to the N resources.

In a fifth possible implementation, the resource configuration is used to indicate at least one reference point corresponding to the N frequency domain resources, at least one offset 2 corresponding to M frequency domain resources, at least one offset 2 corresponding to (N-M) frequency domain resources, and N pieces of frequency domain resource information.

In a sixth possible implementation, the resource information is used to indicate at least one piece of carrier information and at least one piece of frequency domain resource information, and the carrier information is used to indicate a carrier on which a frequency domain resource is located. For example, the carrier information includes one reference point and one offset value (offset 2).

In addition, the N frequency domain resources included in the second-type BWP may be located on a same carrier; or at least one of the N frequency domain resources included in the second-type BWP is located on at least one carrier.

In one embodiment, at least two of the N frequency domain resources included in the second-type BWP may be located on different carriers.

S2102: Determine a resource location of the second-type BWP based on the resource configuration of the second-type BWP.

Therefore, according to the resource configuration method provided in this embodiment of this application, the network device or the terminal device can determine the frequency domain location of the second-type BWP in a case of a discrete spectrum, and receive or send data on the frequency domain location of the second-type BWP based on a parameter value of the second-type BWP, so that utilization of the discrete spectrum is effectively improved and system performance is improved.

Figure 26:
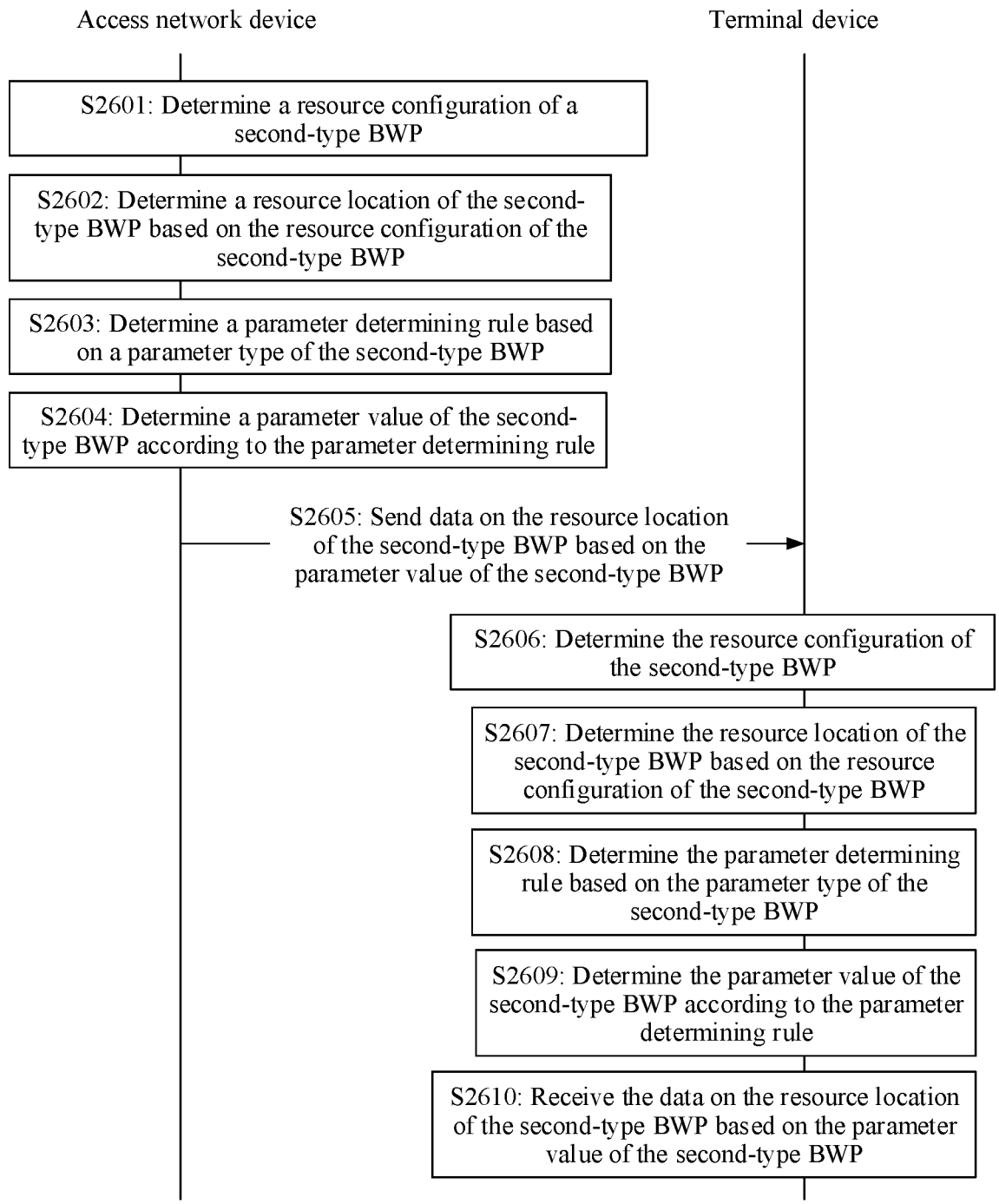
FIG. 26 is a flowchart of a communication method according to an embodiment of this application.

With reference to the parameter configuration method and the resource configuration method described in the foregoing embodiments, an embodiment of this application provides a communication method. The communication method may be applied to a terminal device or a chip built in a terminal device, or the communication method is applied to a network device or a chip built in a network device. This is not limited in the embodiments of this application. In the embodiments of this application, the terminal device and the network device are used as examples to describe the communication method. FIG. 26 is a flowchart of a communication method according to an embodiment of this application. As shown in FIG. 26, the method may include the following operations:

S2601: A network device determines a resource configuration of a second-type BWP.

S2602: The network device determines a resource location of the second-type BWP based on the resource configuration of the second-type BWP.

S2603: The network device determines a parameter determining rule based on a parameter type of the second-type BWP.

S2604: The network device determines a parameter value of the second-type BWP according to the parameter determining rule.

S2605: The network device sends data on the resource location of the second-type BWP based on the parameter value of the second-type BWP.

S2606: A terminal device determines the resource configuration of the second-type BWP.

S2607: The terminal device determines the resource location of the second-type BWP based on the resource configuration of the second-type BWP.

S2608: The terminal device determines the parameter determining rule based on the parameter type of the second-type BWP.

S2609: The terminal device determines the parameter value of the second-type BWP according to the parameter determining rule.

S2610: The terminal device receives the data on the resource location of the second-type BWP based on the parameter value of the second-type BWP.

For sending data to the network device by the terminal device, refer to the process of transmitting data according to the communication method shown in FIG. 26, except that a communication direction is different from that shown in FIG. 26. For determining the resource location of the second-type BWP and determining the parameter value of the second-type BWP, refer to detailed descriptions in the foregoing embodiments of this application. Details are not described herein again in this embodiment of this application.

In the embodiments of this application, a sequence of operations in each method is not limited.

In the embodiments of this application, the network device may determine the parameter value of the second-type BWP by using a configuration of an operator or a network-side algorithm, and this is not limited in this application.

In one embodiment, the method for determining a parameter value of a second-type BWP provided in the embodiments of this application or the method for determining a parameter determining rule provided in the embodiments of this application, for example, the method for determining a parameter value of a second-type BWP corresponding to one or more of operations S1002, S1102, S1202, S1302, S1402, S1502, S1602, S1702, S1802, S1902, S2002, and S2102, also falls within the protection scope of this application.

In the foregoing embodiments provided in this application, the method provided in the embodiments of this application is described separately from perspectives of a network device, a terminal device, and interaction between a network device and a terminal device. It may be understood that, to implement the functions in the method provided in the foregoing embodiments of this application, each network element such as the network device or the terminal device includes a corresponding hardware structure and/or software module for performing the functions. A person skilled in the art should easily be aware that, algorithm operations in the examples described with reference to the embodiments disclosed in this specification can be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device and the terminal device may be divided into function modules based on the foregoing method examples. For example, function modules may be obtained through division based on corresponding functions, or two or more functions may be integrated into one processing module. The integrated module may be implemented in a form of hardware, or may be implemented in a form of a software functional module. It should be noted that, division into the modules in the embodiments of this application is an example, is merely logical function division, and may be other division in actual implementation.

Figure 27:
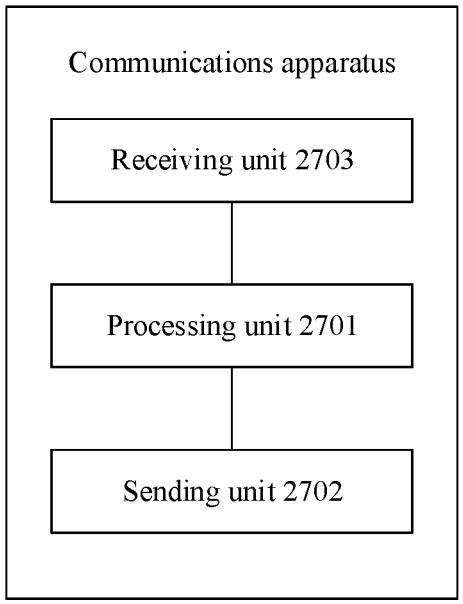
FIG. 27 is an example structural diagram of a communications apparatus according to an embodiment of this application.

When function modules are obtained through division based on corresponding functions, FIG. 27 is a possible schematic composition diagram of the communications apparatus involved in the foregoing embodiments. The communications apparatus can perform operations performed by the network device or the terminal device in any one of the method embodiments of this application. As shown in FIG. 27, the communications apparatus is a terminal device or a communications apparatus that supports a terminal device in implementing the methods provided in the embodiments, where for example, the communications apparatus may be a chip system, or the communications apparatus is a network device or a communications apparatus that supports a network device in implementing the methods provided in the embodiments, where for example, the communications apparatus may be a chip system. The communications apparatus may include a processing unit 2701.

The processing unit 2701 is configured to support the communications apparatus in performing the methods described in the embodiments of this application. For example, the processing unit 2701 is configured to perform or support the communications apparatus in performing S1001 and S1002 in the parameter configuration method shown in FIGS. 10, S1101 and S1102 in the parameter configuration method shown in FIGS. 11, S1201 and S1202 in the parameter configuration method shown in FIGS. 12, S1301 and S1302 in the parameter configuration method shown in FIGS. 13, S1401 and S1402 in the parameter configuration method shown in FIGS. 14, S1501 and S1502 in the parameter configuration method shown in FIGS. 15, S1601 and S1602 in the parameter configuration method shown in FIGS. 16, S1701 and S1702 in the parameter configuration method shown in FIGS. 17, S1801 and S1802 in the parameter configuration method shown in FIGS. 18, S1901 and S1902 in the parameter configuration method shown in FIGS. 19, S2001 and S2002 in the parameter configuration method shown in FIGS. 20, S2101 and S2102 in the resource configuration method shown in FIG. 21, and operations S2601 to S2604 and S2606 to S2609 in the communication method shown in FIG. 26.

In this embodiment of this application, as shown in FIG. 27, the terminal device may further include a sending unit 2702 and a receiving unit 2703.

The sending unit 2702 is configured to send data, for example, configured to support the communications apparatus in performing S2605 in the method shown in FIG. 26.

The receiving unit 2703 is configured to receive data, for example, configured to support the communications apparatus in performing S2610 in the method shown in FIG. 26.

It should be noted that all related content of the operations in the method embodiments can be incorporated into descriptions of functions of the corresponding function modules by reference. Details are not described herein again.

The communications apparatus provided in the embodiments of this application is configured to perform the method in any one of the foregoing embodiments, and therefore can achieve same effects as the method in the foregoing embodiment.

Figure 28:
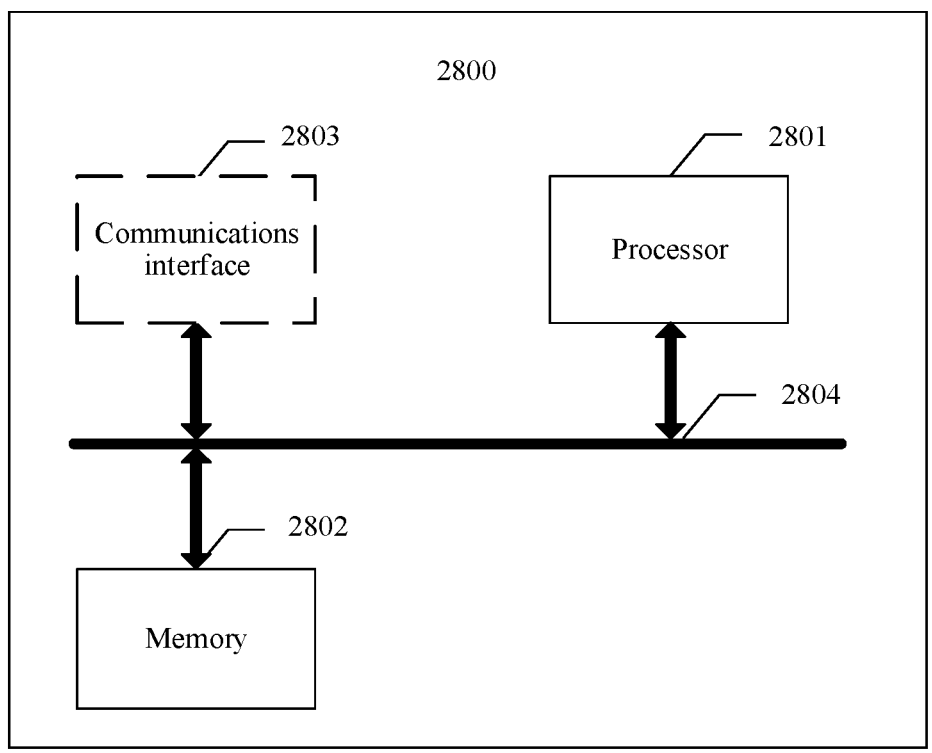
FIG. 28 is an example structural diagram of another communications apparatus according to an embodiment of this application.

FIG. 28 shows a communications apparatus 2800 according to an embodiment of this application. The communications apparatus 2800 is configured to implement functions of the network device in the foregoing methods. The communications apparatus 2800 may be a network device, or may be an apparatus in a network device. The communications apparatus 2800 may be a chip system. In the embodiments of this application, the chip system may include a chip, or may include a chip and another discrete device. Alternatively, the communications apparatus 2800 is configured to implement functions of the terminal device in the foregoing methods. The communications apparatus 2800 may be a terminal device, or may be an apparatus in a terminal device. The communications apparatus 2800 may be a chip system. In the embodiments of this application, the chip system may include a chip, or may include a chip and another discrete device.

The communications apparatus 2800 includes at least one processor 2801, configured to implement functions of the network device or the terminal device in the methods provided in the embodiments of this application. For example, the processor 2801 may be configured to: determine a parameter determining rule based on a parameter type of a second-type BWP, determine a parameter value of the second-type BWP according to the parameter determining rule, determine a resource configuration of the second-type BWP, determine a resource location of the second-type BWP based on the resource configuration of the second-type BWP, and the like. For details, refer to detailed descriptions in the method examples. Details are not described herein again.

The communications apparatus 2800 may further include at least one memory 2802, configured to store a program instruction and/or data. The memory 2802 is coupled to the processor 2801. A coupling in the embodiments of this application is an indirect coupling or communication connection between apparatuses, units, or modules, may be implemented in electrical, mechanical, or other forms, and is used for information exchange between the apparatuses, the units, or the modules. The processor 2801 may cooperate with the memory 2802. The processor 2801 may execute the program instruction stored in the memory 2802. At least one of the at least one memory may be included in the processor.

The communications apparatus 2800 may further include a communications interface 2803, configured to communicate with another device by using a transmission medium, so that an apparatus in the communications apparatus 2800 can communicate with the another device. For example, if the communications apparatus is a network device, the another device is a terminal device. If the communications apparatus is a terminal device, the another device is a network device. The processor 2801 receives and sends data by using the communications interface 2803, and is configured to implement the methods performed by the network device or the terminal device in the embodiments corresponding to FIG. 10 to FIG. 21.

In this embodiment of this application, a connection medium between the communications interface 2803, the processor 2801, and the memory 2802 is not limited. In this embodiment of this application, the communications interface 2803, the processor 2801, and the memory 2802 are connected to each other by using a bus 2804 in FIG. 28. In FIG. 28, the bus is represented by a bold line. A manner of connection between other components is only an example for description, and imposes no limitation. The bus may be classified into an address bus, a data bus, a control bus, or the like. For ease of representation, only one thick line is used to represent the bus in FIG. 28, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, operations, and logical block diagrams disclosed in the embodiments of this application. The general-purpose processor may be a microprocessor or any conventional processor. The operations of the method disclosed with reference to the embodiments of this application may be directly performed by a hardware processor, or may be performed by using a combination of hardware in the processor and a software module.

In the embodiments of this application, the memory may be a nonvolatile memory such as a hard disk drive (HDD) or a solid-state drive (SSD), or may be a volatile memory such as a random access memory (RAM). The memory is any other medium that can carry or store expected program code in a form of an instruction or a data structure and that can be accessed by a computer, but is not limited thereto. The memory in the embodiments of this application may be alternatively a circuit or any other apparatus that can implement a storage function, and is configured to store a program instruction and/or data. The terminal device in the embodiments of this application may be the smartphone shown in FIG. 8. The network device in the embodiments of this application may be the base station shown in FIG. 9.

The descriptions of the foregoing implementations allow a person skilled in the art to clearly understand that, for the purpose of convenient and brief description, division into the foregoing functional modules is taken as an example for illustration. In an actual application, the foregoing functions may be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one physical unit or a plurality of physical units, may be located in one position, or may be distributed to a plurality of positions. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

All or some of the methods provided in the embodiments of this application may be implemented by using software, hardware, firmware, or any combination thereof. When software is used to implement the methods, all or some of the methods may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

The foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A parameter configuration method comprising:
    for a parameter of a second-type bandwidth part (BWP), determining a parameter determining rule based on a parameter type of the second-type BWP, wherein the second-type BWP comprises N frequency domain resources utilized in a wireless communication system, N being a positive integer, N being greater than or equal to 2, and at least two of the N frequency domain resources utilized in the wireless communication system are nonconsecutive;
    when the parameter determining rule is determined to be a first rule A, determining a parameter value of the second-type BWP based on an average value of parameter values of M frequency domain resources in the N frequency domain resources, and M is an integer greater than or equal to 1 and less than or equal to N;
    when the parameter determining rule is determined to be a first rule B, determining the parameter value of the second-type BWP based on a largest parameter value in the parameter values of M frequency domain resources in the N frequency domain resources; and
    when the parameter determining rule is determined to be a second rule, determining the parameter value of the second-type BWP based on a parameter value corresponding to a primary frequency domain resource used to transmit or receive a physical downlink control channel (PDCCH).

2. The parameter configuration method according to claim 1, wherein the determining the parameter value of the second-type BWP based on the parameter values of the M frequency domain resources comprises:
    determining the parameter value of the second-type BWP based on identifiers of the M frequency domain resources and M parameter values of the M frequency domain resources.

3. The parameter configuration method according to claim 2, wherein the determining the parameter value of the second-type BWP based on the identifiers of the M frequency domain resources and the M parameter values of the M frequency domain resources comprises:
    determining the parameter value of the second-type BWP based on a parameter value of a frequency domain resource corresponding to a largest identifier in the identifiers of the M frequency domain resources;
    determining the parameter value of the second-type BWP based on a parameter value of a frequency domain resource corresponding to a smallest identifier in the identifiers of the M frequency domain resources; or
    determining the parameter value of the second-type BWP based on a parameter value of a frequency domain resource corresponding to an identifier in the identifiers of the M frequency domain resources, wherein the identifier is a preconfigured identifier or a received identifier.

4. The parameter configuration method according to claim 1, wherein the determining the parameter value of the second-type BWP based on the parameter values of the M frequency domain resources comprises:
    determining the parameter value of the second-type BWP based on a smallest parameter value in the parameter values of the M frequency domain resources.

5. The parameter configuration method according to claim 1, wherein the determining the parameter value of the second-type BWP based on the parameter values of the M frequency domain resources comprises, determining candidate values of the parameter value of the second-type BWP based on candidate values of the parameter values of the M frequency domain resources, and further comprises:
    determining the candidate values of the parameter value of the second-type BWP based on a union set of the candidate values of the parameter values of the M frequency domain resources; or
    determining the candidate values of the parameter value of the second-type BWP based on an intersection set of the candidate values of the parameter values of the M frequency domain resources.

6. A communications apparatus comprising:
a processor; and
a memory, wherein the memory is coupled to the processor, and the processor is configured to:
for a parameter of a second-type bandwidth part (BWP), determine a parameter determining rule based on a parameter type of the second-type BWP, wherein the second-type BWP comprises N frequency domain resources utilized in a wireless communication system, N being a positive integer, N being greater than or equal to 2, and at least two of the N frequency domain resources utilized in a wireless communication system are nonconsecutive;
when the parameter determining rule is determined to be a first rule A, determine a parameter value of the second-type BWP based on an average value of parameter values of M frequency domain resources in the N frequency domain resources, and M is an integer greater than or equal to 1 and less than or equal to N;
when the parameter determining rule is determined to be a first rule B, determine a parameter value of the second-type BWP based on a largest parameter value in the parameter values of M frequency domain resources in the N frequency domain resources; and
when the parameter determining rule is determined to be a second rule, determine the parameter value of the second-type BWP based on a parameter value corresponding to a primary frequency domain resource used to transmit or receive a physical downlink control channel (PDCCH).

7. The communications apparatus according to claim 6, wherein the processor is further configured to:
determine the parameter value of the second-type BWP based on identifiers of the M frequency domain resources and M parameter values of the M frequency domain resources.

8. The communications apparatus according to claim 7, wherein the processor is further configured to:
determine the parameter value of the second-type BWP based on a parameter value of a frequency domain resource corresponding to a largest identifier in the identifiers of the M frequency domain resources;
determine the parameter value of the second-type BWP based on a parameter value of a frequency domain resource corresponding to a smallest identifier in the identifiers of the M frequency domain resources; or
determine the parameter value of the second-type BWP based on a parameter value of a frequency domain resource corresponding to an identifier in the identifiers of the M frequency domain resources, wherein the identifier is a preconfigured identifier or a received identifier.

9. The communications apparatus according to claim 6, wherein the processor is further configured to:
determine the parameter value of the second-type BWP based on a smallest parameter value in the parameter values of the M frequency domain resources.

10. The communications apparatus according to claim 6, wherein the processor is further configured to:
determine candidate values of the parameter value of the second-type BWP based on candidate values of the parameter values of the M frequency domain resources, wherein:

the candidate values of the parameter value of the second-type BWP is determined based on a union set of the candidate values of the parameter values of the M frequency domain resources; or
the candidate values of the parameter value of the second-type BWP is determined based on an intersection set of the candidate values of the parameter values of the M frequency domain resources.

11. A non-transitory computer-readable storage medium, comprising a computer software instruction, wherein, when the computer software instruction is run on a computer, the computer is enabled to:
for a parameter of a second-type bandwidth part (BWP), determine a parameter determining rule based on a parameter type of the second-type BWP, wherein the second-type BWP comprises N frequency domain resources utilized in a wireless communication system, N being a positive integer, N being greater than or equal to 2, and at least two of the N frequency domain resources utilized in a wireless communication system are nonconsecutive;
when the parameter determining rule is determined to be a first rule A, determine a parameter value of the second-type BWP based on an average value of parameter values of M frequency domain resources in the N frequency domain resources, and M is an integer greater than or equal to 1 and less than or equal to N;
when the parameter determining rule is determined to be a first rule B, determine a parameter value of the second-type BWP based on a largest parameter value in the parameter values of M frequency domain resources in the N frequency domain resources; and
when the parameter determining rule is determined to be a second rule, determine the parameter value of the second-type BWP based on a parameter value corresponding to a primary frequency domain resource used to transmit or receive a physical downlink control channel (PDCCH).

12. The non-transitory computer-readable storage medium according to claim 11, wherein the computer is enabled to:
determine the parameter value of the second-type BWP based on identifiers of the M frequency domain resources and M parameter values of the M frequency domain resources.

13. The non-transitory computer-readable storage medium according to claim 12, wherein the computer is enabled to:
determine the parameter value of the second-type BWP based on a parameter value of a frequency domain resource corresponding to a largest identifier in the identifiers of the M frequency domain resources;
determine the parameter value of the second-type BWP based on a parameter value of a frequency domain resource corresponding to a smallest identifier in the identifiers of the M frequency domain resources; or
determine the parameter value of the second-type BWP based on a parameter value of a frequency domain resource corresponding to an identifier in the identifiers of the M frequency domain resources, wherein the identifier is a preconfigured identifier or a received identifier.

14. The non-transitory computer-readable storage medium according to claim 11, wherein the computer is enabled to:

determine the parameter value of the second-type BWP based on a smallest parameter value in the parameter values of the M frequency domain resources.

15. The non-transitory computer-readable storage medium according to claim 11, wherein the computer is enabled to determine candidate values of the parameter value of the second-type BWP based on candidate values of the parameter values of the M frequency domain resources, wherein:
  the candidate values of the parameter value of the second-type BWP is determined based on a union set of the candidate values of the parameter values of the M frequency domain resources; or
  the candidate values of the parameter value of the second-type BWP is determined based on an intersection set of the candidate values of the parameter values of the M frequency domain resources.

* * * * *